(12) United States Patent
Fujiwara

(10) Patent No.: US 8,570,575 B2
(45) Date of Patent: Oct. 29, 2013

(54) IMAGE FORMING APPARATUS, METHOD OF CONTROLLING THE SAME, AND IMAGE PROCESSING APPARATUS PERFORMING IMAGE FORMATION ON THE BASIS OF A PLURALITY OF PIECES OF IMAGE DATA FOR DIFFERENT COLORS

(75) Inventor: Satoko Fujiwara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 191 days.

(21) Appl. No.: 13/185,716

(22) Filed: Jul. 19, 2011

(65) Prior Publication Data

US 2012/0019860 A1 Jan. 26, 2012

(30) Foreign Application Priority Data

Jul. 23, 2010 (JP) ................................. 2010-166421
Jun. 28, 2011 (JP) ................................. 2011-143585

(51) Int. Cl.
- *G06F 3/12* (2006.01)
- *H04N 1/00* (2006.01)
- *G06K 15/10* (2006.01)
- *G06K 15/00* (2006.01)
- *G06K 9/00* (2006.01)
- *G06K 9/34* (2006.01)

(52) U.S. Cl.
USPC ........... 358/1.15; 358/1.6; 358/1.8; 358/3.06; 358/3.13; 382/162; 382/164; 382/167; 382/173

(58) Field of Classification Search
USPC .......... 358/1.15, 1.6, 1.16, 1.9, 1.8, 1.1, 3.06, 358/3.13, 3.3, 2.1, 3.02, 3.09, 3.11, 3.12, 358/3.21, 3.27, 1.18, 448, 260, 136, 296, 358/432, 404, 501, 508, 540, 524, 534, 358/518; 382/166, 167, 49, 41, 47, 162, 382/164, 169, 171, 173, 254, 307, 305, 309, 382/311; 348/591, 593, 597, 600, 614, 613, 348/625, 656, 661, 672, 501, 502, 530, 537, 348/72, 83, 88, 89

See application file for complete search history.

(56) References Cited

U.S. PATENT DOCUMENTS

| | | | | |
|---|---|---|---|---|
| 6,179,409 | B1 * | 1/2001 | Takahashi | 347/43 |
| 6,680,782 | B1 * | 1/2004 | Jamzadeh | 358/1.14 |
| 2008/0247642 | A1 * | 10/2008 | Eguchi | 382/167 |
| 2010/0265525 | A1 * | 10/2010 | Hagiwara | 358/1.9 |

FOREIGN PATENT DOCUMENTS

| | | |
|---|---|---|
| JP | 2002-254763 | 9/2002 |
| JP | 2006-279582 | 10/2006 |

* cited by examiner

*Primary Examiner* — Ngon Nguyen
(74) *Attorney, Agent, or Firm* — Oblon, Spivak, McClelland, Maier & Neustadt, L.L.P.

(57) ABSTRACT

An image forming apparatus includes an image forming unit that performs image formation on the basis of a plurality of pieces of image data for different colors, the pieces of the image data being generated by a higher-level device; a plurality of data storage units that receive the respective pieces of the image data transferred from the higher-level device via a plurality of first transfer paths corresponding to the respective pieces of the image data, and store therein the respective pieces of the image data; and a control unit that receives control information, which is used for controlling the image formation, from the higher-level device via a second transfer path and controls the data storage units on the basis of the control information so that the data storage units receive and storage therein the respective pieces of the image data transferred from the higher-level device.

7 Claims, 19 Drawing Sheets

(TO IMAGE OUTPUT UNIT)

FIG.7

| No. | CLASSI-FICATION | DESCRIPTION | DIRECTION (DFE⇔PCTL) | CONTENTS |
|---|---|---|---|---|
| 1 | JOB INFOR-MATION | JOB START | ⇔ | NOTICE/RESPONSE OF JOB START COMMUNICATION OF JOB IDENTIFIER (JOB ID) |
| 2 | | JOB END | ⇔ | NOTICE/RESPONSE OF END OF ALL PRINTING PROCESSES REQUESTED BY JOB COMMUNICATION OF JOB IDENTIFIER (JOB ID) |
| 3 | | START OF RECEPTION OF PRINTING PROCESS | ↓ | NOTICE INDICATING THAT PRINTER IS ENABLED TO RECEIVE PRINTING PROCESS |
| 4 | | REQUEST/NOTICE OF PRINT INFORMATION | ⇔ | REQUEST/NOTICE OF NECESSARY PRINTER INFORMATION |
| 5 | | START OF PRINTING PROCESS | ⇔ | NOTICE/RESPONSE INDICATING THAT IMAGE DATA IS READY, WHICH IS PERFORMED IN ORDER OF OUTPUT AND IN UNITS OF PAGES (PROCESSES) |
| 6 | PRINTER STATE/ PRINTING PROC-ESS | REQUEST FOR PRINTING PROCESS | ⇔ | REQUEST/RESPONSE OF PRINTING PROCESS, WHICH IS SENT FROM PRINTER CONTROLLER WITH COLOR, PROCESS IDENTIFICATION NUMBER, PLANE IDENTIFICATION NUMBER IN UNITS OF PLANES AND IN ORDER OF REQUESTS FROM ENGINES. *BITMAP IS ACQUIRED BY ENGINE |
| 7 | | COMPLETION OF DATA TRANSFER | ↑ | NOTICE OF COMPLETION OF DATA TRANSFER FOR REQUESTED PLANE |
| 8 | | COMPLETION OF DATA RECEPTION | ↓ | NOTICE OF COMPLETION OF DATA RECEPTION FOR REQUESTED PLANE |
| 9 | | COMPLETION OF PRINTING PROCESS | ↑ | NOTICES OF COMPLETION OF PRINT REQUEST FOR ALL PAGES (PROCESSES) |
| 10 | | REPORT ON PROCESS STATE | ↓ | NOTICE OF PRINT STATE OF PROCESS *SHEET FEED; *SHEET DISCHARGE, AND *START OF PRINTING |
| 11 | | SC NOTICE OCCURRENCE/ CANCELLATION OF ERROR | ⇔ ↑ | ACQUISITION/NOTICE OF FAILURE INFORMATION ON PRINTER NOTICE OF OCCURRENCE/CANCELLATION OF FAILURE OF HIGHER-LEVEL DEVICE |
| 12 | PRINT CONDI-TIONS | SETTING OF PRINT CONDITIONS | ⇔ | NOTICE/RESPONSE OF PRINT CONDITIONS *PRINT MODE (DOUBLE-SIDED/SINGLE-SIDED); *PRINT TYPE (PAGE WITH DATA/BLANK PAGE); *SHEET FEED/DISCHARGE INFORMATION (FEED SOURCE, DISCHARGE DESTINATION); *ORDER OF SURFACES TO BE PRINTED (TOP TO BACK/BACK TO TOP) *SIZE OF PRINT DATA *RESOLUTION, GRAYSCALE *COLOR INFORMATION |
| 13 | CONNEC-TION | REGISTRATION/ CANCELLATION | ⇔ | REGISTRATION OF INFORMATION BETWEEN HIGHER-LEVEL DEVICE AND PRINTER CONTROLLER |

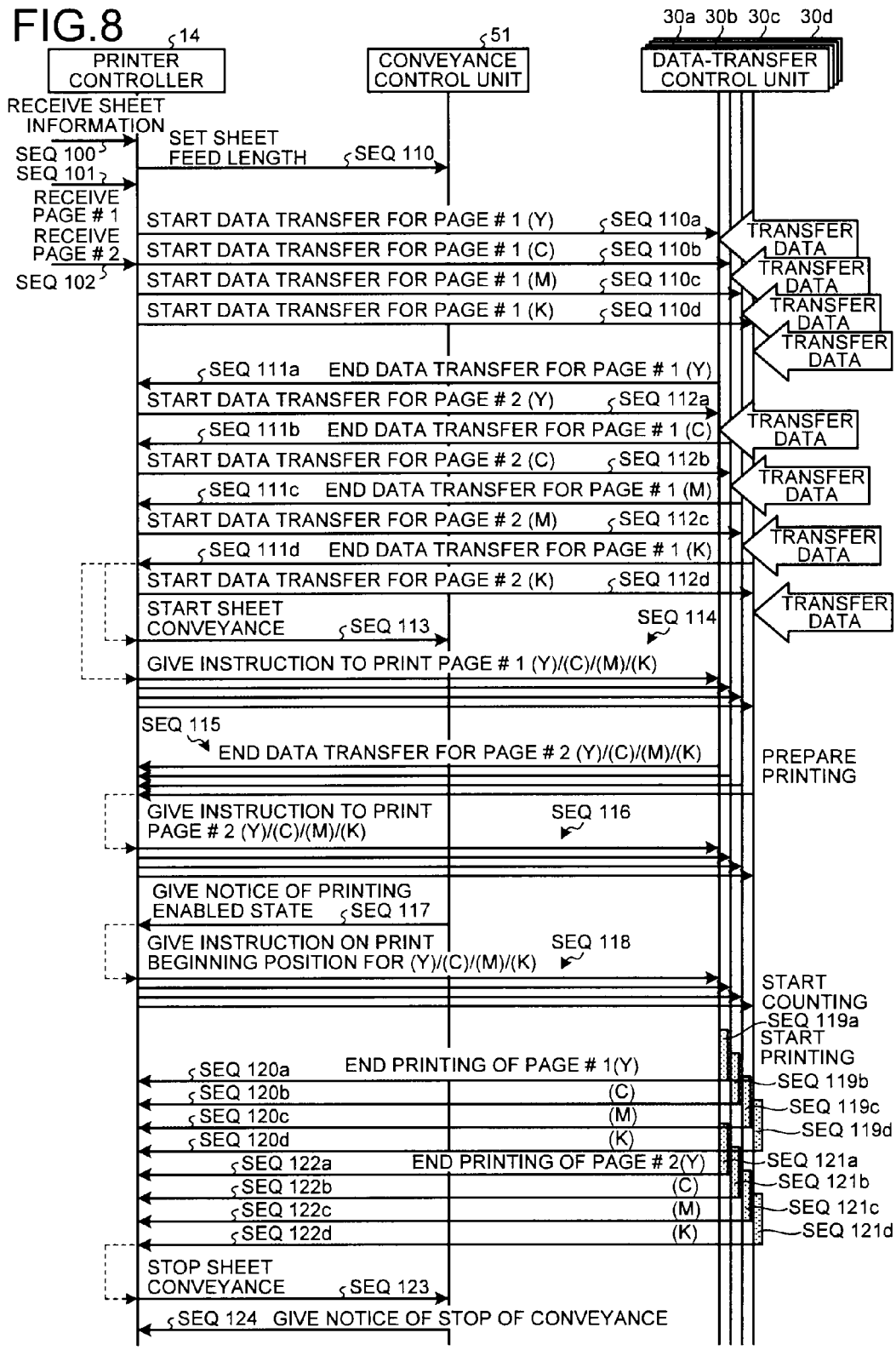

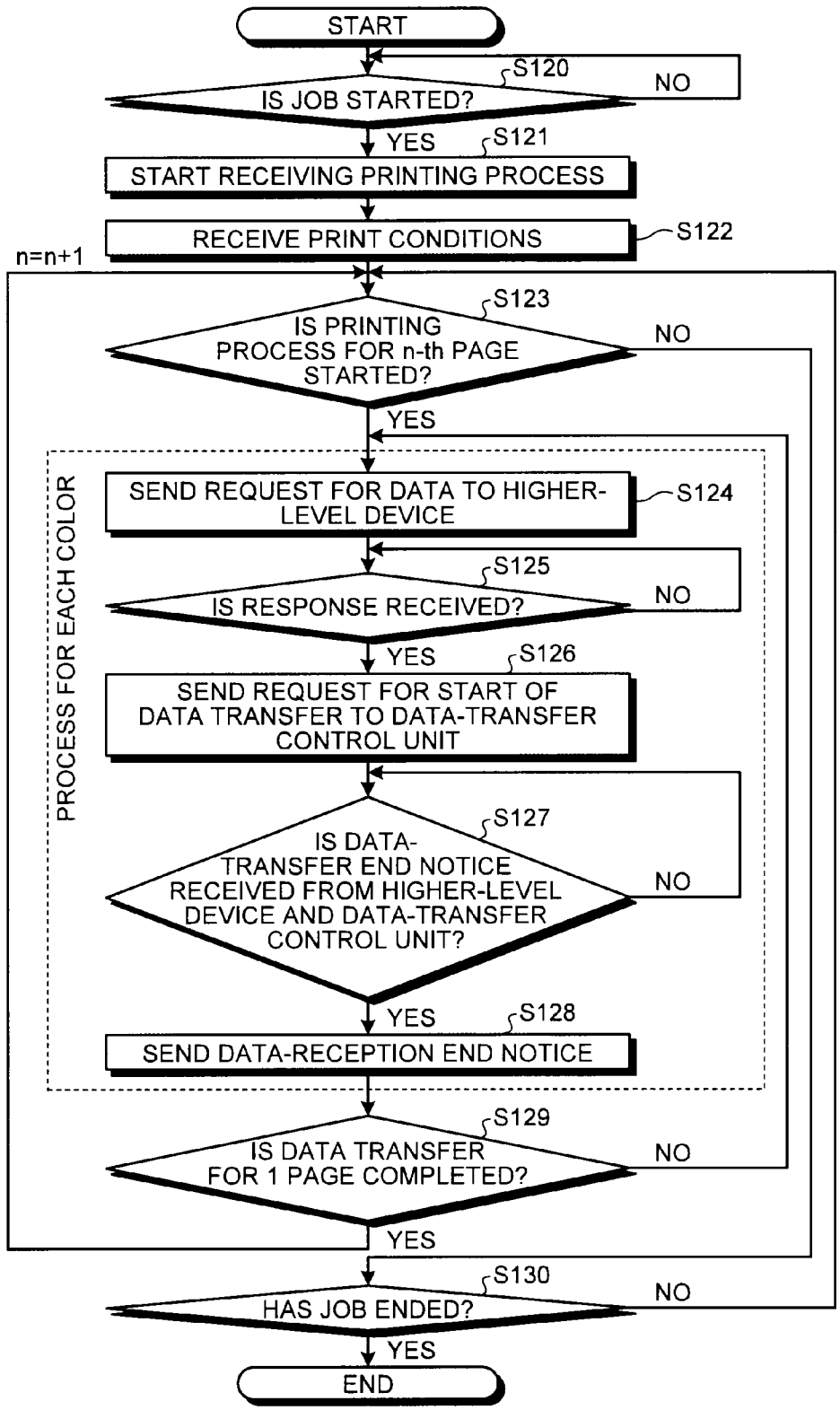

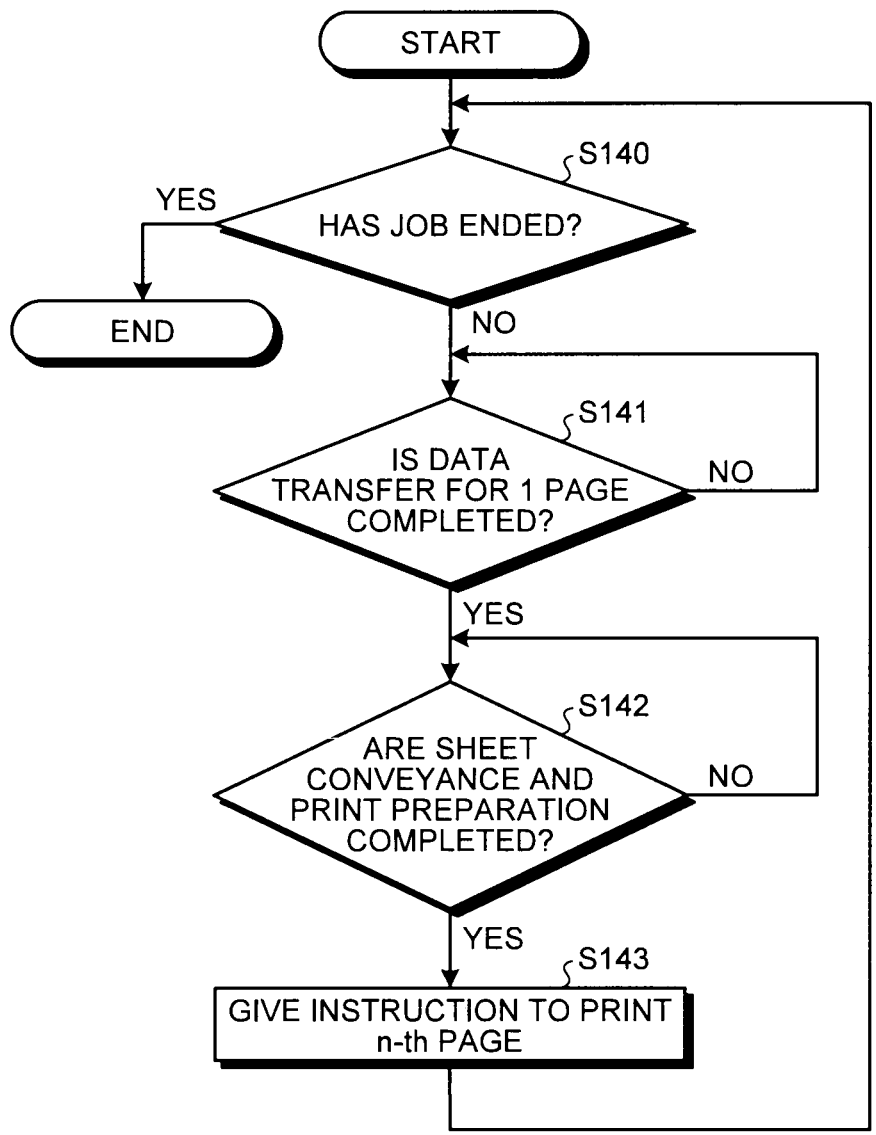

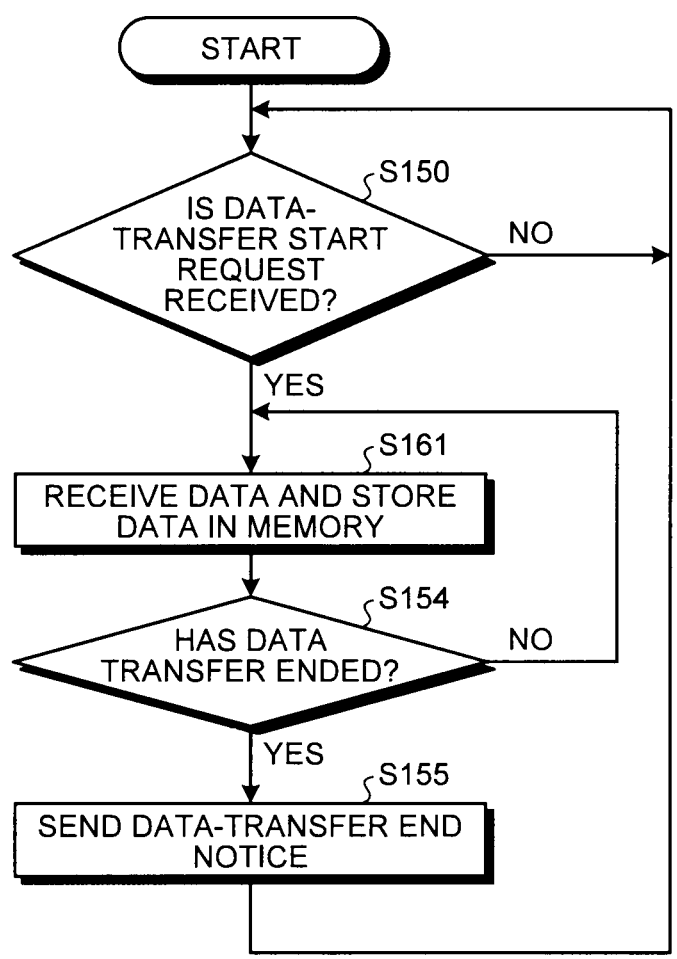

IMAGE FORMING APPARATUS, METHOD OF CONTROLLING THE SAME, AND IMAGE PROCESSING APPARATUS PERFORMING IMAGE FORMATION ON THE BASIS OF A PLURALITY OF PIECES OF IMAGE DATA FOR DIFFERENT COLORS

CROSS-REFERENCE TO RELATED APPLICATIONS

The present application claims priority to and incorporates by reference the entire contents of Japanese Patent Application No. 2010-166421 filed in Japan on Jul. 23, 2010 and Japanese Patent Application No. 2011-143585 filed in Japan on Jun. 28, 2011.

BACKGROUND OF THE INVENTION

1. Field of the Invention

The present invention relates to an image forming apparatus, a method of controlling the image forming apparatus, and an image processing apparatus.

2. Description of the Related Art

Conventionally, there is a known printing system, in which a higher-level device provided separately from a printing device receives a print request from a host device, generates print image data in accordance with the received print request, and sends the print image data to the printing device via a data transfer path to cause the printing device to print the print image data.

Furthermore, there is a known technology relating to the above printing system, in which the data transfer path for connecting the higher-level device and the printing device is separated into a first data transfer path for use to transfer the print image data and a second data transfer path for use to transfer control information on control of printing of the print image data, in order to increase speed of transfer of data from the higher-level device to the printing device.

Japanese Patent Application Laid-open No. 2006-279582 discloses an image processing apparatus that includes separated transfer paths, one of which is used for transferring image data transferred from the higher-level device and the other of which is used for transferring control information for controlling printing, for increasing data transfer speed; an image-data managing unit that manages reception of pieces of image data for respective colors, which are transferred from the higher-level device via transfer paths corresponding to the respective colors, and that transfers the pieces of the image data to a lower-level print output unit; and a print control unit that controls transfer of the pieces of the image data from the image-data managing unit on the basis of the control information.

In the conventional technology as disclosed in Japanese Patent Application Laid-open No. 2006-279582, pieces of image data for all colors are managed by one image-data managing unit. Therefore, the print control unit needs to control the image-data managing unit to transfer a plurality of pieces of image data, so that the control becomes complicated. Consequently, there is a problem in that it is difficult to increase speed of transfer of the image data from the higher-level device to the image-data managing unit and speed of transfer of the image data from an image-data transferring unit to the print output unit.

SUMMARY OF THE INVENTION

It is an object of the present invention to at least partially solve the problems in the conventional technology.

According to an aspect of the present invention, there is provided an image forming apparatus that includes an image forming unit that performs image formation on the basis of a plurality of pieces of image data for different colors, the pieces of the image data being generated by a higher-level device; a plurality of data storage units that receive the respective pieces of the image data transferred from the higher-level device via a plurality of first transfer paths corresponding to the respective pieces of the image data, and store therein the respective pieces of the image data; and a control unit that receives control information, which is used for controlling the image formation, from the higher-level device via a second transfer path and controls the data storage units on the basis of the control information so that the data storage units receive and storage therein the respective pieces of the image data transferred from the higher-level device.

According to another aspect of the present invention, there is provided a method of controlling an image forming apparatus that includes an image forming unit, a plurality of data storage units, and a control unit. The method includes performing, by the image forming unit, image formation on the basis of a plurality of pieces of image data for different colors, the pieces of the image data being generated by a higher-level device; receiving, by the data storage units, the respective pieces of the image data transferred from the higher-level device via a plurality of first transfer paths corresponding to the respective pieces of the image data; storing, in the data storage units, the respective pieces of the image data; receiving, by the control unit, control information for controlling the image formation from the higher-level device via a second transfer path; and controlling, by the control unit, reception of the pieces of the image data transferred from the higher-level device at the receiving the control information, and storage of the pieces of the image data at the storing, on the basis of the control information.

According to still another aspect of the present invention, there is provided an image processing apparatus that includes an image generating unit that forms a plurality of pieces of image data for different colors on the basis of print data supplied from a host device; a storage unit that stores therein the pieces of the image data; and a control unit that sends a print start request to a printer device via a first transfer path in order to give instruction to start printing the pieces of the image data, and when receiving control information from the printer device via the first transfer path in response to the print start request, controls transfer of the pieces of the image data stored in the storage unit. The control unit controls transfer of the pieces of the image data to respective memory units of the printer via respective second transfer paths.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram illustrating exemplary control information that is sent and received between the higher-level device and a printer controller of the printer device;

FIG. 8 is a sequence diagram schematically illustrating an exemplary printing process according to the embodiment of the present invention;

FIG. 9B is a flowchart of an exemplary process performed by the printer controller according to the embodiment of the present invention;

FIG. 9C is a flowchart of an exemplary print instruction process performed by the printer controller according to the embodiment of the present invention;

FIG. 11B is a flowchart of an exemplary process performed by a data-transfer control unit according to the modification of the embodiment of the present invention.

DETAILED DESCRIPTION OF THE PREFERRED EMBODIMENTS

Exemplary embodiments of a printing system according to the present invention will be explained in detail below with reference to the accompanying drawings. To facilitate understanding, an overview of production printing to which a printing system according to an embodiment is applied will be explained first. The basic concept of the production printing is to perform a large amount of printing in a short period of time. Therefore, in the production printing, to speed up printing and efficiently manage jobs and print data, a workflow system is constructed that manages operations from generation of print data to distribution of printed matters.

The printing system according to the embodiment relates to a section that performs printing in the workflow of the production printing. In the printing system, a Raster Image Processor (RIP) process and printing of bitmap data obtained by the RIP process are performed by different devices. The RIP process takes a longer process time than any other printing processes. Therefore, by separating a device that performs the RIP process from a device that performs other printing processes, it is possible to increase printing speed.

Overview of a Printing System Applicable to the Embodiment

Figure 1:
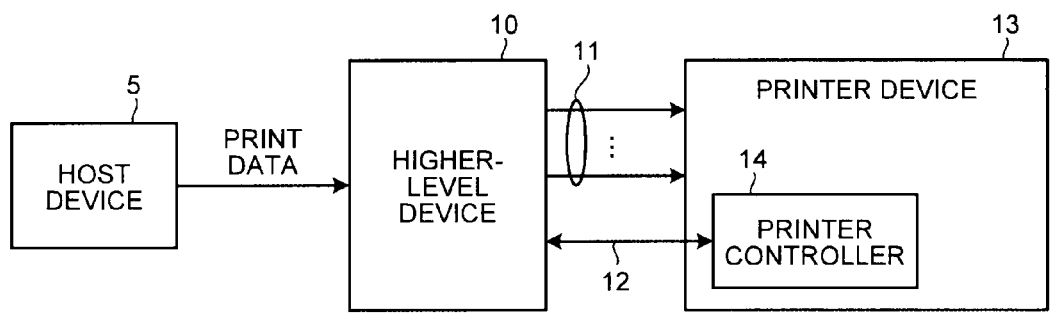
FIG. 1 is a block diagram of an exemplary configuration of a printing system applicable to an embodiment of the present invention.

FIG. 1 illustrates an exemplary configuration of a printing system applicable to an embodiment of the present invention. The printing system includes a higher-level device 10 and a printer device 13 as an image forming apparatus, and these devices are connected to each other with a plurality of data lines 11 and a control line 12. The higher-level device 10 performs the RIP process in accordance with print job data supplied from a host device 5 and generates bitmap data as print image data for each color. The higher-level device 10 also generates control information, which is used for controlling printing operations, on the basis of the print job data, information on the host device 5, or the like.

The print image data for each color, which is generated by the higher-level device 10, is supplied to a printer engine unit (not illustrated) of the printer device 13 via each of the data lines 11. The higher-level device 10 and a printer controller 14 send and receive the control information, which is used for controlling printing, with each other via the control line 12. The printer controller 14 controls the printer engine unit on the basis of the sent or received control information to form an image on a printing medium and performs printing in accordance with a print job. Concrete examples of the control information will be explained later with reference to FIGS. 10A to 10E.

A printing method is not specifically limited. According to the embodiment, a printing sheet is used as a printing medium and an inkjet method is employed to form a print image on the printing sheet. However, the embodiment is not limited to this example and may be applied to a printing device that forms a print image on a printing sheet by using toner. As the printing sheet, a continuous-form paper (continuous stationary) is used that is a continuous form having perforations at predetermined intervals for allowing separation of pieces of the printing sheet. In the production printing, the continuous-form paper as above is generally used as the printing sheet. However, the printing sheet is not limited to the above and may be a cut sheet of a fixed size, such as the A4 size or the B4 size. In the continuous-form paper, a page means a region surrounded by the perforations that are provided at predetermined intervals.

The printing medium to be printed by the printing system according to the embodiment is not limited to a paper printing sheet. In other words, any printing media that are printable by a printing method applied to the embodiment and that can be provided in the form of a roll may be used. For example, a plastic film or a cloth may be used as the printing medium.

Higher-Level Device

Figure 2A:
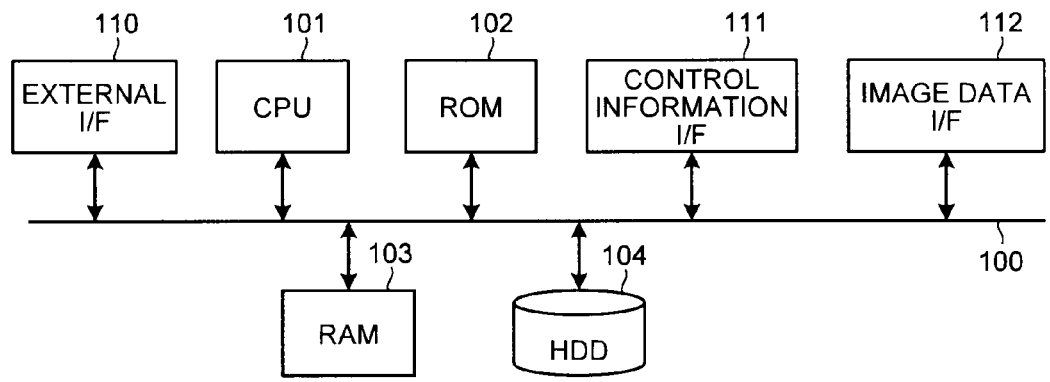
FIG. 2A is a block diagram of an exemplary configuration of a higher-level device.

FIG. 2A illustrates an exemplary configuration of the higher-level device 10. A central processing unit (CPU) 101, a read only memory (ROM) 102, a random access memory (RAM) 103, and a hard disk drive (HDD) 104 are connected to a bus 100. An external I/F 110, a control information I/F 111, and an image data I/F 112 are also connected to the bus 100. The units connected to the bus 100 can perform communication with one another via the bus 100.

Programs for operating the CPU 101 are stored in advance in the ROM 102 and the HDD 104. The RAM 103 is used as a working memory of the CPU 101. That is, the CPU 101 controls the whole operation of the higher-level device 10 in accordance with the programs stored in the ROM 102 and the HDD 104 while using the RAM 103 as the working memory.

The external I/F 110 corresponds to, for example, Transmission Control Protocol/Internet Protocol (TCP/IP) and controls communication with the host device. The control information I/F 111 controls communication of control information. The image data I/F 112 controls communication of print image data and includes a plurality of channels. For example, print image data for each color, i.e., yellow (Y), cyan (C), magenta (M), or black (K), generated by the higher-level device 10 is output from a corresponding channel. The image data I/F 112 is required to realize high transfer speed; therefore, for example, a Peripheral Component Interconnect Bus Express (PCI Express) is used. A system of the control information I/F 111 is not specifically limited; however, in the following explanation, PCI Express is used similarly to the image data I/F 112.

With the above configuration, print job data sent from the host device is received by the external I/F 110 of the higher-level device 10 and stored in the HDD 104 via the CPU 101. The CPU 101 performs the RIP process on the basis of the print job data read from the HDD 104, generates bitmap data for each color, and writes the bitmap data into the RAM 103. For example, the CPU 101 performs rendering on page description language (PDL) data through the RIP process in order to generate the bitmap data for each color and writes the bitmap data into the RAM 103. The CPU 101 performs compression encoding on the bitmap data for each color written in the RAM 103 and temporarily stores the compression-encoded data in the HDD 104.

When, for example, the printer device 13 starts printing operations, the CPU 101 reads the compression-encoded bitmap data for each color from the HDD 104, decodes the compression-encoded bitmap data, and writes the decompressed bitmap data for each color into the RAM 103. The CPU 101 reads the bitmap data for each color from the RAM 103 and outputs each bitmap data as print image data for a corresponding color from a corresponding channel of the image data I/F 112 in order to supply the print image data to the printer device 13. The CPU 101 sends and receives control information, which is used for controlling printing, to and from the printer device 13 via the control information I/F 111 depending on the progress of the printing operations or the like.

Figure 2B:
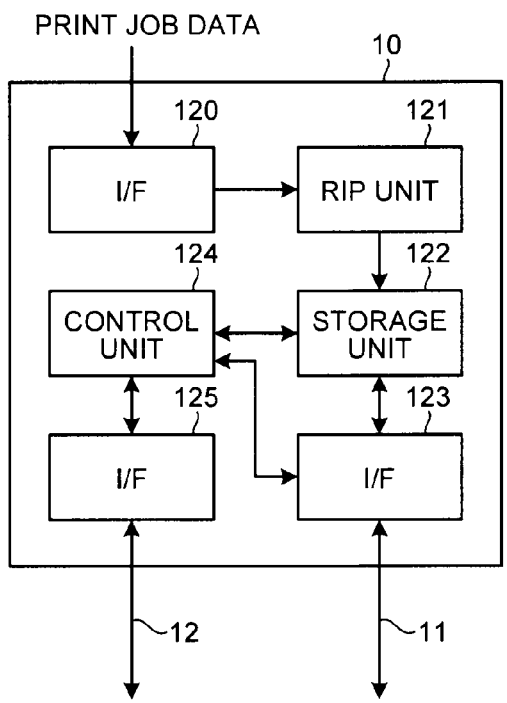
FIG. 2B is a functional block diagram explaining exemplary functions of the higher-level device.

FIG. 2B is a functional block diagram explaining exemplary functions of the higher-level device 10. The higher-level device 10 includes interfaces (I/Fs) 120, 123, and 125, an RIP unit 121, a storage unit 122, and a control unit 124. The I/Fs 120, 123, and 125 correspond to the external I/F 110, the image data I/F 112, and the control information I/F 111 of FIG. 2A, respectively. The RIP unit 121 and the control unit 124 are constructed by programs that run on the CPU 101 of FIG. 2A. The storage unit 122 corresponds to at least one of the RAM 103 and the HDD 104 of FIG. 2A.

The host device generates print job data containing PDL data and sends the print job data to the higher-level device 10. The print job data is received by the I/F 120 and supplied to the RIP unit 121. The RIP unit 121 performs rendering on the basis of the PDL data contained in the supplied print job data to thereby generate pieces of print image data based on the bitmap data for respective Y, C, M, and K colors. The RIP unit 121 sequentially stores the generated pieces of print image data for the respective Y, C, M, and K colors in the storage unit 122.

The control unit 124 performs communication with the printer controller 14 of the printer device 13 via the I/F 125. For example, the control unit 124 generates control information, which is used to control printing performed by the printer device 13, on the basis of the print job data supplied from the host device via the I/F 120. The control information is sent from the control unit 124 to the printer controller 14 via the I/F 125.

The I/F 123 allows independent access to the pieces of the print image data for the respective C, M, Y, and K colors stored in the storage unit 122. The I/F 123 is connected to the printer device 13 via the data lines 11 corresponding to the respective Y, C, M, and K colors. The I/F 123 sends and receives control information on transfer of the pieces of the print image data for the respective Y, C, M, and K colors to and from the printer device 13 via the data lines, and transfers the pieces of the print image data for the respective Y, C, M, and K colors to the printer device 13 via the data lines.

Printer Device

Figure 3:
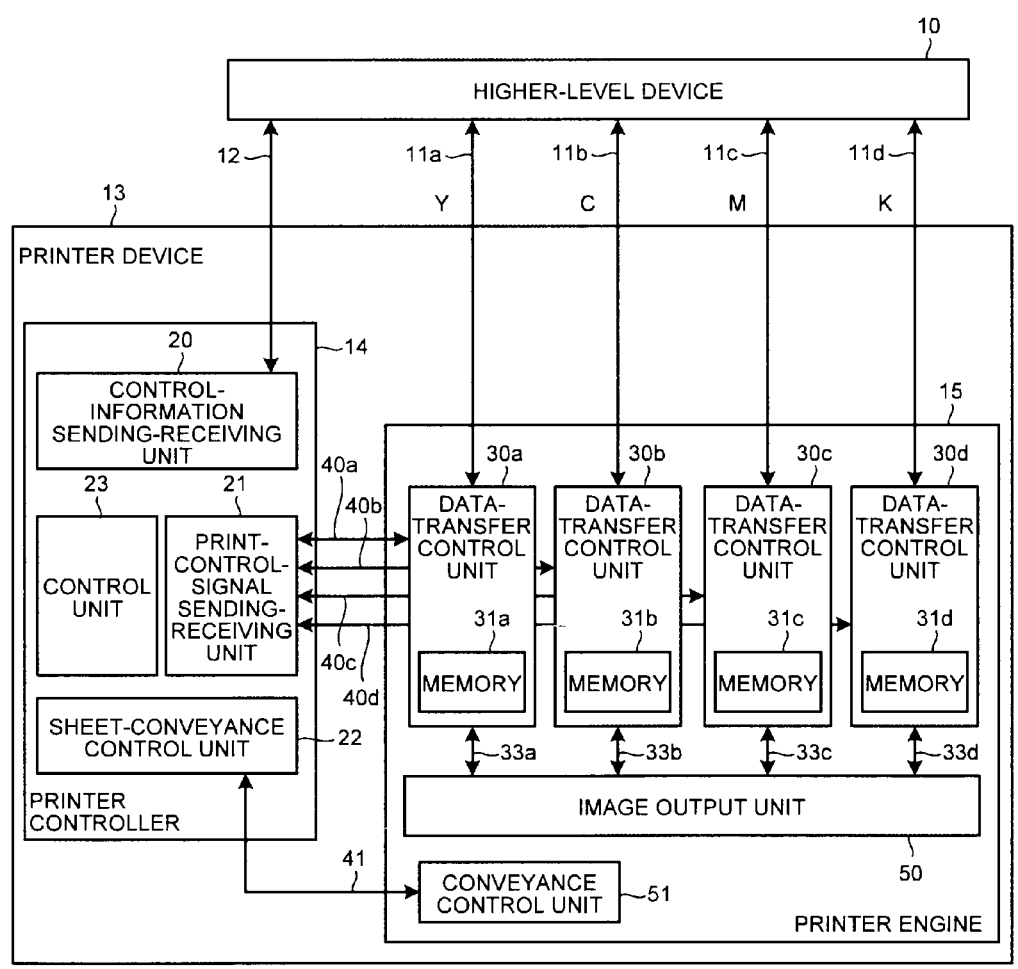
FIG. 3 is a block diagram of an exemplary configuration of a printer device.

FIG. 3 illustrates an exemplary configuration of the printer device 13. The printer device 13 includes the printer controller 14 and a printer engine 15. The printer controller 14 is connected to the control line 12 and controls printing operations by sending and receiving control information to and from the higher-level device 10 via the control line 12. The printer engine 15 is connected to a plurality of data lines 11a, 11b, 11c, and 11d and performs a printing process by using the print image data for each color transferred from the higher-level device 10 via the data lines 11a, 11b, 11c, and 11d, under the control by the printer controller 14.

The printer controller 14 and the printer engine 15 will be explained in detail below. The printer controller 14 includes a control-information sending-receiving unit 20, a print-signal sending-receiving unit 21, a sheet-conveyance control unit 22, and a control unit 23.

The control-information sending-receiving unit 20 sends and receives control information for controlling printing to and from the higher-level device 10 via the control line 12. The print-signal sending-receiving unit 21 is connected to each of data-transfer control units 30a, 30b, 30c, and 30d with corresponding one of engine I/F control lines 40a, 40b, 40c, and 40d, which will be explained later. The print-signal sending-receiving unit 21 separately sends and receives a control signal to and from each of the data-transfer control units 30a, 30b, 30c, and 30d. The sheet-conveyance control unit 22 is connected to a conveyance control unit 51, which will be explained later, with a conveyance control line 41, and sends and receives a control signal for controlling sheet conveyance to and from the conveyance control unit 51.

The control unit 23 includes, for example, a CPU, a ROM, and a RAM, and controls each unit of the printer controller 14 in accordance with programs, which are stored in advance in the ROM, by using the RAM as a working memory. The control unit 23 interprets the control information, which has been sent from the higher-level device 10 and received by the control-information sending-receiving unit 20, and sends the control information to the print-signal sending-receiving unit 21 and the sheet-conveyance control unit 22.

The control-information sending-receiving unit 20, the print-signal sending-receiving unit 21, and the sheet-conveyance control unit 22 may be structured as hardware controlled by the control unit 23, or may be structured as modules of programs that run on the control unit 23.

The printer engine 15 includes a plurality of the data-transfer control units 30a, 30b, 30c, and 30d; an image output unit 50 that performs image formation by outputting an image based on the print image data onto a sheet; and the conveyance control unit 51 that controls conveyance of a printing sheet.

The data-transfer control units 30a, 30b, 30c, and 30d are connected to the data lines 11a, 11b, 11c, and 11d, respectively. The data-transfer control units 30a, 30b, 30c, and 30d include memories 31a, 31b, 31c, and 31d, respectively. The data-transfer control units 30a, 30b, 30c, and 30d respectively store, in the memories 31a, 31b, 31c, and 31d, pieces of print image data for different colors that are transferred via the data lines 11a, 11b, 11c, and 11d.

It is preferable that each of the memories 31a, 31b, 31c, and 31d has a capacity for storing pieces of print image data of at least three pages. The pieces of the print image data of three pages correspond to, for example, a piece of print image data of a page that is being transferred from the higher-level device 10, a piece of print image data of a page that is being outputted, and a piece of print image data of a next page. However, the capacity is not limited to the above, and each of the memories 31a, 31b, 31c, and 31d may have a capacity for storing pieces of print image data of two pages or less.

The data-transfer control units 30a, 30b, 30c, and 30d are connected to the print-signal sending-receiving unit 21 via the engine I/F control lines 40a, 40b, 40c, and 40d, respectively. The print-signal sending-receiving unit 21 can separately send and receive a control signal to and from the data-transfer control units 30a, 30b, 30c, and 30d via the respective engine I/F control lines 40a, 40b, 40c, and 40d.

Figure 4A:
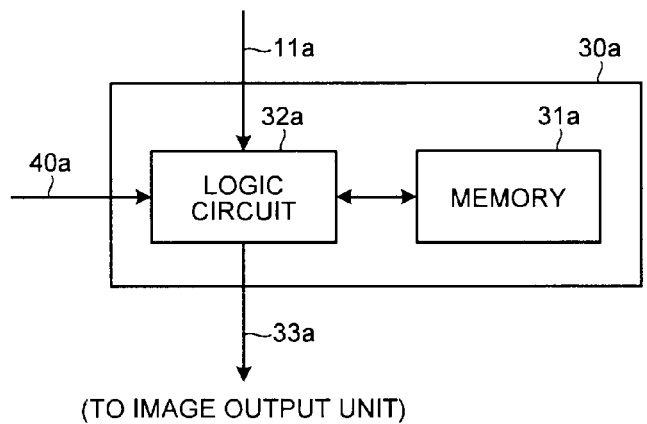
FIG. 4A is a block diagram schematically illustrating an exemplary configuration of a data-transfer control unit.

FIG. 4A is a block diagram schematically illustrating an exemplary configuration of the data-transfer control unit 30a. A common configuration is applied to each of the data-transfer control units 30a, 30b, 30c, and 30c; therefore, only the configuration of the data-transfer control unit 30a is illustrated in FIG. 4A as a representative of the data-transfer control units 30a, 30b, 30c, and 30d.

The data-transfer control unit 30a includes the memory 31a and a logic circuit 32a. The engine I/F control line 40a and the data line 11a are connected to the logic circuit 32a. The logic circuit 32a stores the print image data, which has been transferred from the higher-level device 10 via the data line 11a, in the memory 31a in accordance with a control signal that is received from the print-signal sending-receiving unit 21 via the engine I/F control line 40a. Similarly, the logic circuit 32a reads the print image data from the memory 31a and supplies the print image data to the image output unit 50, which will be explained later, via an output line 33a in accordance with a control signal that is received from the print-signal sending-receiving unit 21 via the engine I/F control line 40a.

The control by the logic circuit 32a, which is constructed by hardware by a combination of a logic circuit and the like, has advantages in that it is possible to branch processes when interrupt occurs in the program or it is possible to perform a high-speed process on the control of the CPU. For example, the logic circuit 32a performs logical determination on a control signal, which is formed of a bit sequence and is received via the engine I/F control line 40a, and determines a process to be executed. However, the functions equivalent to those of the logic circuit 32a can be implemented by software using a CPU.

The print image data for each color, which is output from each of the data-transfer control units 30a, 30b, 30c, and 30d, is supplied to the image output unit 50. The image output unit 50 performs printing on the print image data for each color. According to the embodiment, the print image data is printed by using an inkjet method, in which printing is performed by ejecting ink through nozzles arranged on heads. However, the printing method is not limited to the inkjet method. For example, a laser printing method may be used.

Figure 4B:
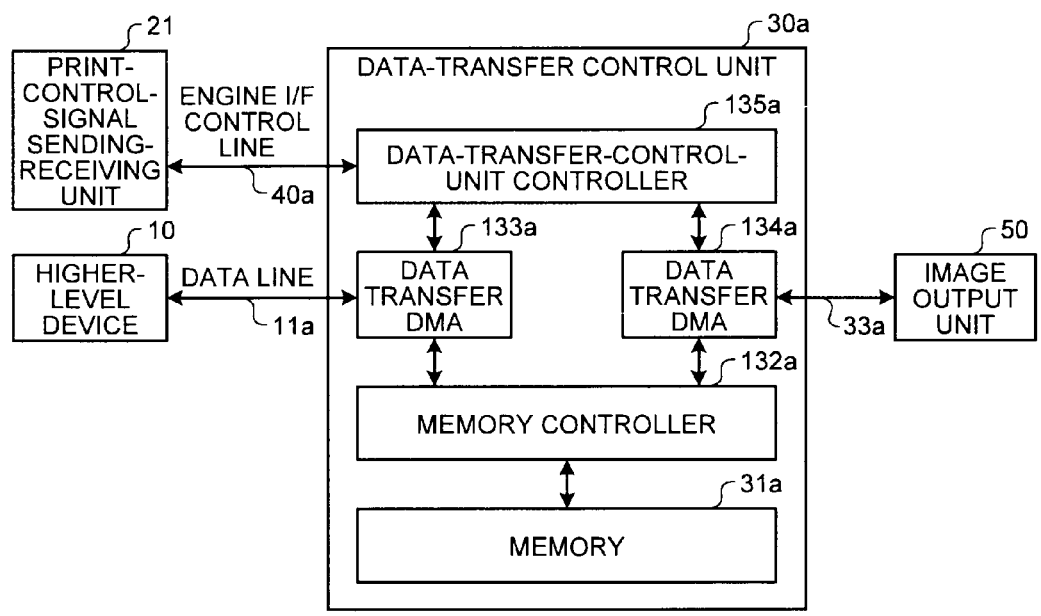
FIG. 4B is a block diagram of a concrete example of the configuration of the data-transfer control unit.

FIG. 4B illustrates a concrete example of the configuration of the data-transfer control unit 30a. In FIG. 4B, the same component as those of FIG. 4A are denoted by the same reference numerals and the detailed explanation will not be repeated. The data-transfer control unit 30a includes the memory 31a, a memory controller 132a, a data transfer direct memory accesses (DMAs) 133a and 134a, and a data-transfer-control-unit controller 135a. The memory controller 132a, the data transfer DMAs 133a and 134a, and the data-transfer-control-unit controller 135a are included in the logic circuit 32a of FIG. 4A.

The memory controller 132a controls access to the memory 31a. The data transfer DMA 133a receives print image data from the higher-level device 10 and writes the print image data into the memory via the memory controller 132a. The data transfer DMA 134a reads data from the memory 31a via the memory controller 132a and transfers the data to the image output unit 50 via the output line 33a. The data-transfer-control-unit controller 135a receives control information that is sent from the print-signal sending-receiving unit 21 of the printer controller 14 via the engine I/F control line 40a, and controls the data transfer DMAs 133a and 134a in accordance with the received control information.

For example, when the data-transfer-control-unit controller 135a receives a data-transfer start request sent from the print-signal sending-receiving unit 21 via the engine I/F control line 40a, the data-transfer-control-unit controller 135a instructs the data transfer DMA 133a to start data transfer in accordance with the request. The data transfer DMA 133a sends a data transfer request to the higher-level device 10 via the data line 11a in accordance with the instruction. The data sent from the higher-level device 10 in accordance with the request is received by, for example, the data transfer DMA 133a and written at a predetermined address in the memory 31a via the memory controller 132a.

When the data-transfer-control-unit controller 135a receives a print instruction sent from the print-signal sending-receiving unit 21 via the engine I/F control line 40a, the data-transfer-control-unit controller 135a instructs the data transfer DMA 134a to read data from the memory 31a. The data transfer DMA 134a reads the data from the memory 31a via the memory controller 132a in accordance with the instruction. Then, the data transfer DMA 134a transfers the read data to the image output unit 50 via the output line 33a.

Figure 5:
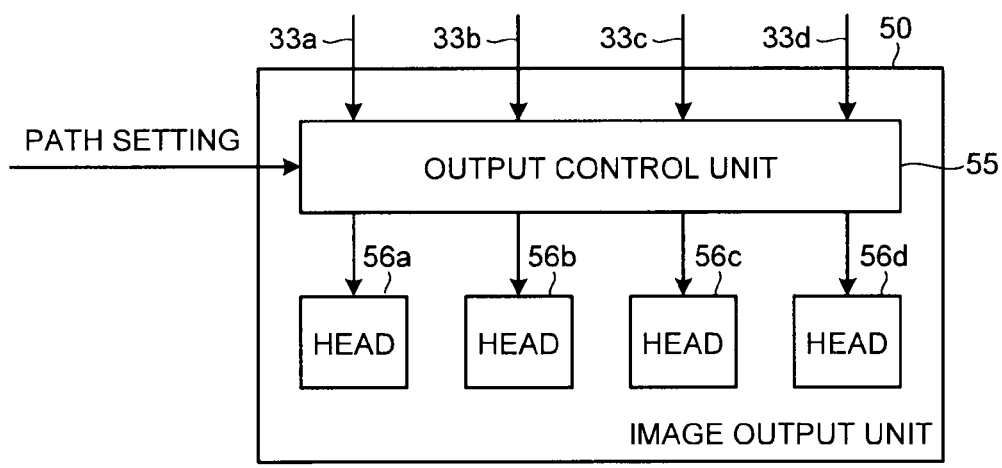
FIG. 5 is a block diagram of an exemplary configuration of an image output unit.

FIG. 5 illustrates an exemplary configuration of the image output unit 50. The image output unit 50 includes an output control unit 55 and heads 56a, 56b, 56c, and 56d for the respective Y, C, M, and K colors. The correspondence between the colors and the heads 56a, 56b, 56c, and 56d is not limited to this example. The output control unit 55 controls connections between the data-transfer control units 30a, 30b, 30c, and 30d, the output lines 33a, 33b, 33c, and 33d that are used for outputting print image data, and the heads 56a, 56b, 56c, and 56d. That is, the output control unit 55 can select one of the output lines 33a, 33b, 33c, and 33d for each of the heads 56a, 56b, 56c, and 56d to set a connection path.

For example, the output control unit 55 can make a setting to connect the output lines 33a, 33b, 33c, and 33d to the heads 56a, 56b, 56c, and 56d in one-to-one correspondence. For another example, the output control unit 55 can make a setting to connect the output lines 33a, 33b, 33c, and 33d to the heads 56a, 56b, 56c, and 56d in one-to-many correspondence such that the output line 33a is connected to the heads 56a, 56b, 56c, and 56d.

The connection paths between the output lines 33a, 33b, 33c, and 33d and the heads 56a, 56b, 56c, and 56d may be set by user operation using a dip switch or the like. However, the way to setting the connection paths is not limited to the above, and a control signal sent from the print-signal sending-receiving unit 21 may be used.

As described above, in the printer device 13 according to the embodiment, transfer of the print image data from the higher-level device 10 and sending and receiving of the control signal, which is used for controlling printing of the print image data, between the higher-level device 10 and the printer device 13 are performed via different paths. Furthermore, pieces of print image data for respective colors are transferred via the different data lines 11a, 11b, 11c, and 11d, and the pieces of the print image data for the respective colors transferred via the data lines 11a, 11b, 11c, and 11d are separately controlled and supplied to the respective data-transfer control units 30a, 30b, 30c, and 30d that have common structures. Moreover, in the image output unit 50, connection paths between outputs of the data-transfer control units 30a, 30b, 30c, and 30d and the heads 56a, 56b, 56c, and 56d for the respective colors can be set by user operation or the like.

Therefore, in the printer device 13 according to the embodiment, the configuration of the printer engine 15 can be easily changed depending on the number of colors of the print image data (for example, four colors of Y, C, M and K or only a color of K) or the number of heads used in the image output unit 50. In this case, only needed units from among the data-transfer control units 30a, 30b, 30c, and 30d can be provided for the printer engine 15 depending on a required structure.

For example, when full-color printing using four colors of C, M, Y, and K is to be performed, all of the data-transfer control units 30a, 30b, 30c, and 30d are provided for the printer engine 15, and outputs of the data-transfer control units 30a, 30b, 30c, and 30d are connected to the heads 56a, 56b, 56c, and 56d, respectively in the output control unit 55. For another example, when monochrome printing using a single color of K is to be performed and if priority is given to saving apparatus costs, only one data-transfer control unit 30a and one head 56a are provided such that an output of the data-transfer control unit 30a is connected to the head 56a in the output control unit 55. For still another example, when monochrome printing using a single color of K is to be performed and if priority is given to printing speed, one data-transfer control unit 30a and the four heads 56a, 56b, 56c, and 56d are provided such that an output of the data-transfer control unit 30a is connected to each of the heads 56a, 56b, 56c, and 56d in the output control unit 55. In this case, because the same color is printed a number of times and in a superimposed manner, an ink ejection time for each of the heads 56a, 56b, 56c, and 56d are set to, for example, ¼ of a normal time and speed of conveyance of a printing sheet is increased to four times a normal speed in order to perform high-speed printing.

Printing-Sheet Conveying System

Figure 6:
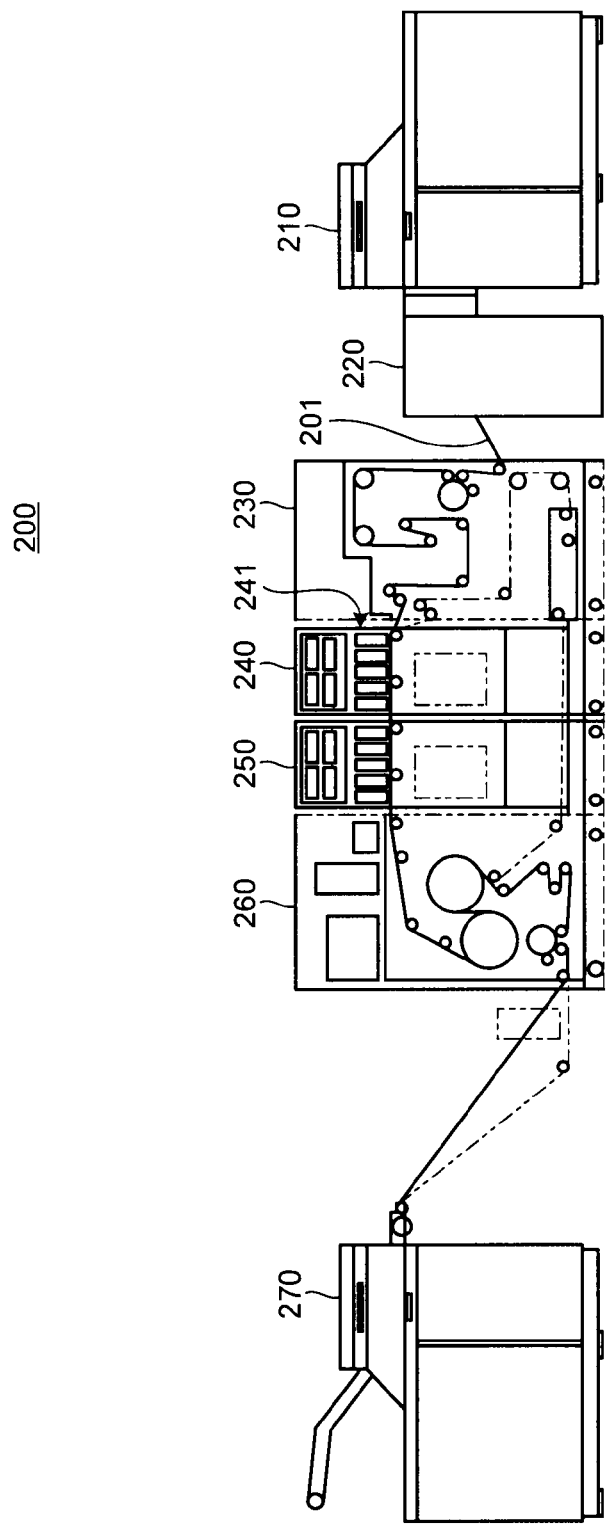
FIG. 6 is a schematic diagram of an exemplary structure of the printer device including a sheet conveying system applicable to the embodiment of the present invention.

Referring to FIG. 3, the conveyance control unit 51 is connected to the print-signal sending-receiving unit 21 via the conveyance control line 41 and controls conveyance of a sheet on which an image based on the print image data is formed by the image output unit 50. FIG. 6 schematically illustrates an exemplary structure of a printer device 200 including a sheet conveying system applicable to the embodiment. As explained above, according to the embodiment, the printer device 200 uses a continuous-form paper as a printing sheet.

A printing sheet 201 is supplied from a printing-sheet supplying unit 210 to a first conveying unit 230 via a power-supply operation box 220. In the first conveying unit 230, the printing sheet 201 is conveyed via a plurality of rollers or the like under the conveyance control by the conveyance control unit 51 and a position of the printing sheet is adjusted. Then, the printing sheet is supplied to printer engine units 240 and 250 that correspond to the printer engine 15 described above.

In the printer engine units 240 and 250, a printing unit 241 corresponding to the image output unit 50 described above performs printing on the printing sheet 201 supplied from the first conveying unit 230, in accordance with the print image data. The printing sheet 201, for which the printing has ended, is discharged from the printer engine unit 250 under the conveyance control by the conveyance control unit 51 and supplied to a second conveying unit 260. The printing sheet 201, for which the printing has ended, is conveyed in a pre-determined manner inside the second conveying unit 260 so that the printing sheet is discharged and supplied to a cutting unit 270. The printing sheet 201, for which the printing has ended, is cut into pages in accordance with the perforations by the cutting unit 270.

The printer device 200 performs printing on the printing sheet 201 that is a continuous form made up of successive pages. Therefore, after the printing on the printing sheet 201 has ended in the printer engine units 240 and 250, the printing sheet 201 is continuously present on a path along which the printing sheet 201 is discharged from the second conveying unit 260.

If a structure formed of the first conveying unit 230, the printer engine units 240 and 250, and the second conveying unit 260 is additionally provided such that the printing sheet 201, for which printing has ended and which is discharged from the second conveying unit 260 in the preceding stage, is inverted and then supplied to the first conveying unit 230 in the subsequent stage, it is possible to perform duplex printing on the printing sheet 201.

Details of the Printing Process According to the Embodiment

The printing process according to the embodiment will be explained in detail below. FIG. 7 illustrates exemplary control information that is sent and received between the higher-level device 10 and the printer controller 14 of the printer device 13 via the control line 12. In FIG. 7, DFE represents the higher-level device 10 and MIC represents the printer controller 14. The control information generally contains (1) job information, (2) information indicating a printer state and a printing process, (3) information indicating printing conditions, and (4) information indicating a connection.

(1) The job information is used to give notice of a job start and a job end. The information on the job start includes a notice that indicates a start of a job and that is sent from the higher-level device 10 to the printer controller 14 and includes a response that is sent from the printer device 13 to the higher-level device 10 in reply to the notice. The information on the job end includes a notice that indicates an end of all printing processes requested by the job start and that is sent from the higher-level device 10 to the printer controller 14 and includes a response that is sent from the printer controller 14 to the higher-level device 10 in reply to the notice. When the response is sent in reply to the notice of the job start or the job end, a job identifier (JOB ID) for identifying a job is also sent from the printer controller 14 to the higher-level device 10.

(2) The information indicating a printer state and a printing process is used to give notice of a start of reception of a printing process; a request and notice of printer information; a start of the printing process; a request for a printing process; completion of data transfer; completion of data reception; completion of the printing process; a report on a process state; a service control (SC) notice; and occurrence and cancellation of an error.

The information on the start of reception of a printing process is sent from the printer device 13 to the higher-level device 10 as a notice indicating that the printer controller 14 is enabled to receive a printing process. The information on the request and notice of printer information includes a request that is sent from the higher-level device 10 to the printer controller 14 for requesting necessary printer information and includes a response that is sent from the printer controller 14 to the higher-level device 10 in reply to the request.

The information on the start of a printing process includes a notice that is sent from the higher-level device 10 to the printer controller 14 as a notice indicating that preparation of print image data is completed and includes a response that is sent from the printer device 13 to the higher-level device 10 in reply to the notice. A notice of completion of the preparation of the print image data is sent in order of output of the print image data and in units of pages (processes). The page is a unit of printing that is performed by a series of printing operations.

The information on the request for a printing process includes a notice that is sent from the printer controller 14 to the higher-level device 10 as a notice of a printing process and includes a response that is sent from the higher-level device 10 to the printer controller 14 in reply to the notice. The printer controller 14 notifies the higher-level device 10 of color information (Yellow, Cyan, Magenta, or Black) indicating a color of Y, C, M, or K used for printing, a process ID as a process identification number, and a plane identification number, in response to the request for a printing process. A plane corresponds to an image to be printed on one page in accordance with print image data for each color. The printer controller 14 sends the information in units of planes and in order of requests from engines, that is, the data-transfer control units 30a, 30b, 30c, and 30d. That is, the print image data formed of the bitmap data is acquired by the printer engine 15 from the higher-level device 10.

The information on the completion of data transfer is sent from the higher-level device 10 to the printer controller 14 as a notice indicating that transfer of the print image data of a requested plane is completed. The information on the completion of data reception is sent from the printer controller 14 to the higher-level device 10 as a notice indicating that reception of the print image data of a requested plane is completed. The information on the completion of a printing process is sent from the higher-level device 10 to the printer controller 14 as a notice indicating that a print request for all pages (processes) is completed. The information on the report of a process state is sent from the printer controller 14 to the higher-level device 10 as a notice of a print state of a page (a process). At this time, the printer controller 14 acquires, from the printer engine 15, information on sheet feed, sheet discharge, and a start of printing, adds the acquired information to the notice, and sends the notice with the added information to the higher-level device 10.

The SC notice is used to request, by the higher-level device 10, the printer controller 14 to acquire failure information on the printer device 13 and is used to notify, by the printer controller 14, the higher-level device 10 of the failure information that is acquired in response to the request. The information on occurrence and cancellation of an error is sent from the higher-level device 10 to the printer controller 14 as a notice indicating that an error has occurred or an error has been cancelled in the higher-level device 10.

(3) The information indicating print conditions includes setting of print conditions, more specifically, a notice of print conditions that is sent from the higher-level device 10 to the printer controller 14 and a response that is sent from the printer controller 14 in reply to the notice. Examples of the print conditions include a print mode, a print type, information on sheet feed and sheet discharge, an order of surfaces to be printed, a size of a printing sheet, a size of print data, resolution and grayscale, and color information.

The print mode indicates, for example, whether double-sided printing or single-sided printing is performed on the printing sheet 201. The print type indicates if print image data is present and printing is to be performed on the print image data or if print image data is not present and a page is to be left blank. The information on sheet feed and sheet discharge indicates identification information on stackers that serve as a feed source and a discharge destination of the printing sheet 201. The order of surfaces to be printed indicates whether printing is performed from a top side to a back side or from the back side to the top side of the printing sheet 201. The size of a printing sheet indicates, when, for example, the printing sheet is a continuous-form paper, a length of a page to be printed in a conveying direction of the printing sheet 201. The size of print data indicates a data size of print image data. The resolution and grayscale indicates resolution and grayscale that are used when print image data is printed on the printing sheet 201. The color information indicates whether printing is performed by using full colors of C, M, Y, and K colors or by using a single color of a K color.

(4) The information indicating a connection includes information on registration and cancellation, and is used by the higher-level device 10 and the printer controller 14 for registering or cancelling each other's information.

Printing Sequence

A printing process according to the embodiment will be explained below. FIG. 8 is a sequence diagram schematically illustrating an exemplary printing process according to the embodiment. In this example, it is assumed that full-color printing using C, Y, M, and K colors is performed. When receiving, as control information, information on the printing sheet 201 from the higher-level device 10 (SEQ 100), the printer controller 14 sets a sheet feed length to the conveyance control unit 51 on the basis of the received information (SEQ 110). The sheet feed length is, for example, a size of one page in the conveying direction.

When receiving information on a start of a job for the first page (page #1) from the higher-level device 10 (SEQ 101), the printer controller 14 requests the data-transfer control units 30a, 30b, 30c, and 30d to start transferring data of the first page for the respective Y, C, M, and K colors (SEQ 110a, 110b, 110c, and 110d). The data-transfer control unit 30a requests the higher-level device 10 to transfer print image data of the first page for the C color via the data line 11a in accordance with the request, and stores, in the memory 31a, the print image data of the first page for the C color that has been transferred from the higher-level device 10 in response to the request.

Similarly, the data-transfer control units 30b, 30c, and 30d request the higher-level device 10 to transfer pieces of print image data of the first page for the C, M, and K colors via the data lines 11b, 11c, and 11d in accordance with the requests received at SEQ 110b, 110c, and 110d, respectively. The data-transfer control units 30b, 30c, and 30d respectively store, in the memories 31b, 31c, and 31d, the pieces of the print image data of the first page for the C, M, and K colors that have been transferred from the higher-level device 10 in response to the requests.

In the example of FIG. 8, while the printer controller 14 is requesting the data-transfer control units 30a, 30b, 30c, and 30d to transfer the data of the first page, the printer controller 14 receives information on a start of a job for the second page from the higher-level device 10 (SEQ 102). The received print job is stored in a memory (not illustrated) or the like.

When the higher-level device 10 ends the data transfer of the print image data of the first page for each color, the data-transfer control units 30a, 30b, 30c, and 30d send notices of the end to the printer controller 14 (SEQ 111a, 111b, 111c, and 111d). The printer controller 14 sends a response to each notice and requests the data-transfer control units 30a, 30b, 30c, and 30d to start transferring data of the second page (page #2) (SEQ 112a, 112b, 112c, and 112d).

The data-transfer control units 30a, 30b, 30c, and 30d request the higher-level device 10 to transfer pieces of print image data of the second page for the respective colors in response to the requests, and respectively store, in the memories 31a, 31b, 31c, and 31d, the pieces of the print image data of the second page for the respective colors that have been transferred from the higher-level device 10 in response to the requests.

Each of the data-transfer control units 30a, 30b, 30c, and 30d can recognize the end of the data transfer on the basis of a data volume of the transferred print image data. For example, the information on the data volume of the print image data for one page is added to the header of the print image data by the higher-level device 10 at the time the data transfer to the data-transfer control units 30a, 30b, 30c, and 30d is started. When the print image data is transferred in a predetermined unit, the higher-level device 10 may add end information indicating the end of the transfer of one page to the last transfer unit of the print image data for one page. For another example, the higher-level device 10 may send information indicating the end of the transfer of the print image data for one page to each of the data-transfer control units 30a, 30b, 30c, and 30d separately from the print image data and immediately after the print image data for one page is transferred.

Meanwhile, when receiving the notices of the end of the data transfer of the first page from all of the data-transfer control units 30a, 30b, 30c, and 30d, the printer controller 14 requests the conveyance control unit 51 to start conveying a sheet (SEQ 113). The conveyance control unit 51 starts conveying the printing sheet 201 at predetermined speed in response to the request. At the same time the printer controller 14 requests the conveyance control unit 51 to start sheet conveyance, the printer controller 14 instructs the data-transfer control units 30a, 30b, 30c, and 30d to start printing the first page (SEQ 114).

When, for example, the printing sheet 201 reaches a predetermined position, the conveyance control unit 51 notifies the printer controller 14 that printing is enabled (SEQ 117). The printer controller 14 gives instruction on a print beginning position to the data-transfer control units 30a, 30b, 30c, and 30d in accordance with the notice of the printing enabled state received from the conveyance control unit 51 (SEQ 118).

Each of the data-transfer control units 30a, 30b, 30c, and 30d starts printing in accordance with the instruction on the print beginning position. In this example, it is assumed that the heads 56a, 56b, 56c, and 56d are arranged in this order along the conveying direction of the printing sheet 201 as the heads for the respective Y, C, M, and K colors. In this case, when the print beginning position for the first page of the printing sheet 201 reaches a print position for the head 56a, the data-transfer control unit 30a starts reading the print image data of the first page from the memory 31a. The print image data for the Y color read from the memory 31a is transferred to the image output unit 50. The print image data is supplied to the head 56a via the output control unit 55 and printing is performed on the printing sheet 201 (SEQ 119a). When the printing of the first page for the Y color ends, a notice of the end is sent to the printer controller 14 (SEQ 120a).

Subsequently, when the print beginning position for the first page of the printing sheet 201 reaches a print position for the head 56b, the data-transfer control unit 30b starts reading the print image data of the first page from the memory 31b. The print image data for the C color read from the memory 31b is transferred to the image output unit 50. The print image data is supplied to the head 56b via the output control unit 55 and printing is started on the printing sheet 201 (SEQ 119b). When the printing of the first page for the Y color ends, a notice of the end is sent to the printer controller 14 (SEQ 120b).

Similarly, printing for the M and K colors is started in sequence (SEQ 119c and 119d). When the printing ends, notices of the end are sent to the printer controller 14 (SEQ 120c and 120d).

Meanwhile, when transfer of the pieces of the print image data of the second page for the respective colors, which have been started at SEQ 112a to 112d described above, ends, the data-transfer control units 30a, 30b, 30c, and 30d send notices of the end to the printer controller 14 (SEQ 115). The printer controller 14 instructs the data-transfer control units 30a, 30b, 30c, and 30d to start printing of the second page in response to the notices of the end of the data transfer (SEQ 116).

Each of the data-transfer control units 30a, 30b, 30c, and 30d starts printing of the second page after the printing of the first page ends. For example, after the printing of the first page ends (SEQ 120a) and when the print beginning position for the second page of the printing sheet 201 reaches the print position for the head 56a, the data-transfer control unit 30a reads the print image data of the second page for the C color from the memory 31a and supplies the print image data to the image output unit 50, so that printing is started on the printing sheet 201 (SEQ 121a). After the printing for the C color ends, a notice of the end is sent to the printer controller 14 (SEQ 122a).

Similarly, when the print beginning position for the second page reaches the print position for each of the heads 56b, 56c, and 56d, each of the data-transfer control units 30b, 30c, and 30d reads the print image data for a corresponding color from the memories 31b, 31c, and 31d, so that printing is started on the printing sheet 201 (SEQ 121b to 121d). After the printing for each color ends, a notice of the end is sent to the printer controller 14 (SEQ 122b to 122d).

When receiving the notice of the end of printing of the second page for the K color from the data-transfer control unit 30d, the printer controller 14 determines that the printing of the last page for the print job has ended and requests the conveyance control unit 51 to stop conveying the printing sheet 201 (SEQ 123). The conveyance control unit 51 stops conveying the printing sheet 201 in response to the request and sends a notice of the stop to the printer controller 14 (SEQ 124). Accordingly, a series of the printing process ends.

Details of the Printing Process

The printing process according to the embodiment will be explained in detail below. In the embodiment, each of the data-transfer control units 30a to 30d acquires control information for controlling printing, from the higher-level device 10 under the control by the printer controller 14. Each of the data-transfer control units 30a to 30d stores image data for a corresponding color transferred from the higher-level device 10 in corresponding one of the memories 31a to 31d under the control by the printer controller 14.

A data transfer process on the print image data according to the embodiment will be explained with reference to FIGS. 9A to 9D. In the following, the data lines 11a, 11b, 11c, and 11d transfer pieces of print image data for respective Y, C, M, and K colors, and the data-transfer control units 30a, 30b, 30c, and 30d control data transfer of the pieces of the print image data for the respective Y, C, M, and K colors.

Figure 9A:
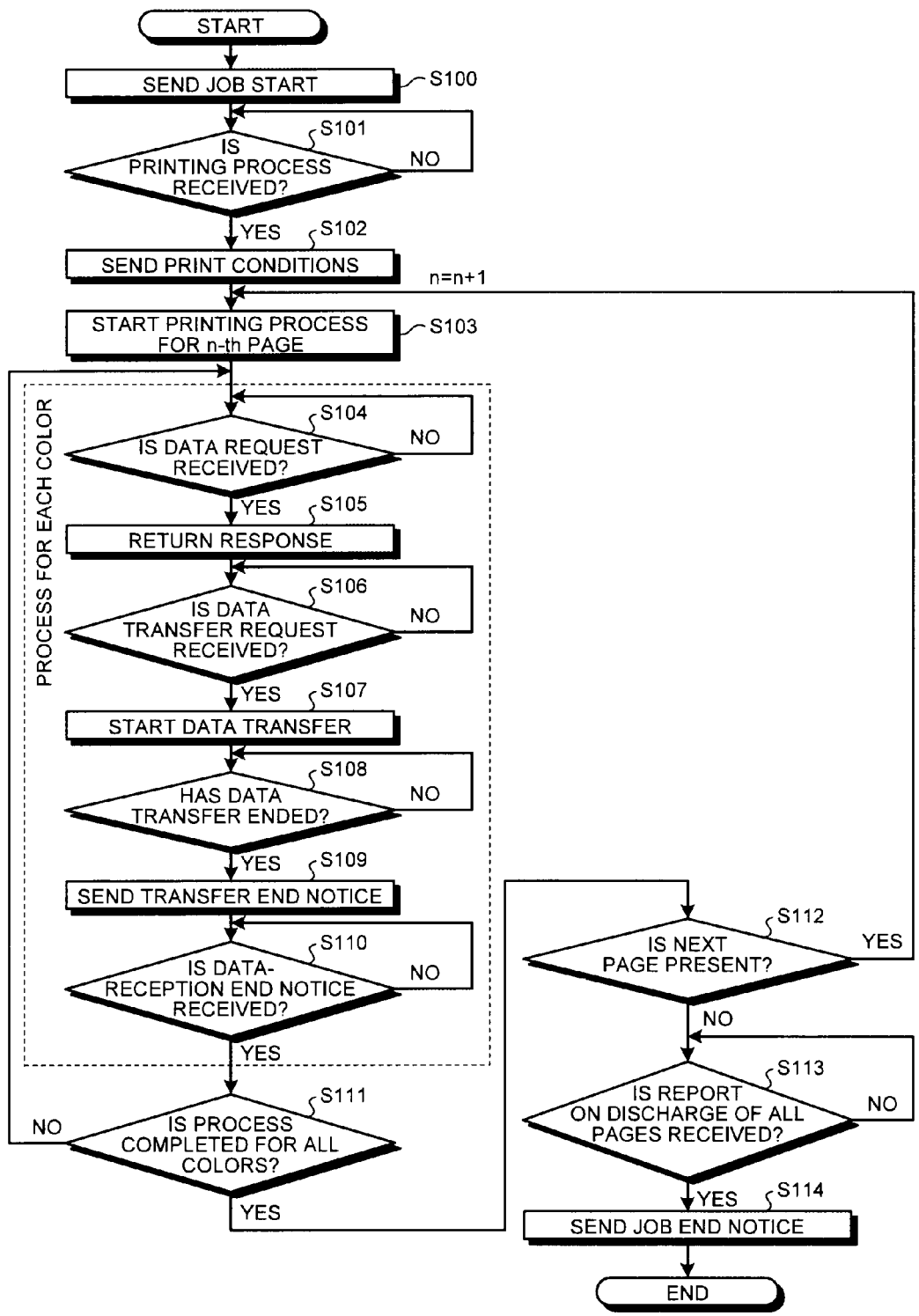
FIG. 9A is a flowchart of an exemplary process performed by the higher-level device according to the embodiment of the present invention.

FIG. 9A is a flowchart of an exemplary process performed by the higher-level device 10 in relation to the data transfer. When receiving job data from a host device, the higher-level device 10 sends control information indicating a start of a job to the printer controller 14 via the control line 12 at Step S100.

The higher-level device 10 waits for a control signal indicating reception of a printing process to be sent from the printer controller 14 in response to the control information (Step S101).

When receiving the control signal indicating the reception of the printing process from the printer controller 14, the higher-level device 10 sends control information on print conditions indicated in the job data to the printer controller 14 via the control line 12 at Step S102, and sends a control signal for starting a printing process for the n-th page to the printer controller 14 via the control line 12 at Step S103, where n is the page number. The processes from Step S103 to Step S112 are performed in units of pages.

The processes from Step S104 to Step S110 are performed for each of the Y, C, M, and K colors. In the following, processes related to the Y color will be mainly explained. At Step S104, the higher-level device 10 waits for reception of a data request for, for example, print image data for the Y color from the printer controller 14. When receiving the data request sent from the printer controller 14 via the control line 12, the higher-level device 10 returns a response to the received data request to the printer controller 14 at Step S105. At Step S106, the higher-level device 10 waits for a data transfer request to be sent from the data-transfer control unit 30a via the data line 11a.

When receiving the data transfer request from the data-transfer control unit 30a via the data line 11a, the higher-level device 10 starts transferring image data for the Y color to the data-transfer control unit 30a at Step S107. The image data for the Y color is transferred to the data-transfer control unit 30a via the data line 11a. At this time, the higher-level device 10 adds information indicating the size of the print image data to the print image data for the Y color that is to be transferred.

At Step S108, the higher-level device 10 waits for an end of the data transfer for one page for the Y color. Referring to FIG. 2B for example, in the higher-level device 10, the control unit 124 monitors the storage unit 122 and the I/F 123 to determine whether data with a volume corresponding to one page has been transferred or not for each of the Y, C, M, and K colors. When it is determined that the data transfer for one page for the Y color has ended, the process proceeds to Step S109, at which a data-transfer end notice that indicates the end of the data transfer for one page is sent to the printer controller 14 via the control line 12. At Step S110, the higher-level device 10 waits for reception of a data-reception end notice for the Y color from the printer controller 14.

At Step S111, the higher-level device 10 determines whether the data-reception end notices have been received for all of the Y, C, M, and K colors. When it is determined that the notices have not been received, the process returns to Step S104, and the processes for a next color is performed.

In FIG. 9A, it is explained that the processes from Step S104 to Step S110 are sequentially performed for the Y, C, M, and K colors; however, the present invention is not limited to this example. For example, it is possible to concurrently perform the processes from Step S104 to Step S110 for the Y, C, M, and K colors. In this case, at Step S111, the higher-level device 10 waits for data-reception end notices received at Step S110 in the respective processes for the Y, C, M and K colors.

When determining that the data-reception end notices for all of the Y, C, M, and K colors are received at Step S111, the higher-level device 10 proceeds the process to Step S112 and determines whether a printing process for a next page is to be performed. The number of pages to be printed can be acquired from the print job received from the host device. When it is determined that the printing process for the next page is to be performed, the page number is incremented such that n=n+1, and the process returns to Step S103.

On the other hand, when determining that the data transfer for all of the pages indicated by the print job data has ended, the process proceeds to Step S113, at which the higher-level device 10 waits for reception of a sheet discharge report on all of the pages from the printer controller 14. When receiving the sheet discharge report on all of the pages from the printer controller 14, the higher-level device 10 proceeds the process to Step S114, at which the higher-level device 10 sends a job end notice indicating that all the print jobs have ended to the printer controller 14 via the control line 12.

FIG. 9B is a flowchart of an exemplary process performed by the printer controller 14 in relation to the data transfer. At Step S120, the printer controller 14 waits for control information indicating a start of a job to be sent from the higher-level device 10 via the control line 12. When receiving the control information, the printer controller 14 returns a response to the higher-level device 10 via the control line 12 at Step S121. At Step S121, the printer controller 14 also sends control information indicating a start of reception of a print job to the higher-level device 10 via the control line 12. At Step S122, the printer controller 14 receives control information indicating print conditions from the higher-level device 10 via the control line 12.

At Step S123, the printer controller 14 determines whether or not the control signal indicating a start of a printing process for the n-th page has been received from the higher-level device 10 via the control line 12. When it is determined that the control signal has not been received, the process proceeds to Step S130, at which the printer controller 14 determines whether a job end notice has been received from the higher-level device 10 via the control line 12. When it is determined that the job end notice has not been received, the process returns to Step S123. On the other hand, when, at Step S130, it is determined that the job end notice has been received, a series of the processes is terminated.

When determining that the control signal indicating the start of the printing process has been received from the higher-level device 10 via the control line 12 at Step S123, the printer controller 14 proceeds the process to Step S124. The processes from Step S124 to Step S129 are performed for each of the Y, C, M, and K colors. In the following, a process of transferring the print image data for the Y color will be explained.

At Step S124, the printer controller 14 sends a request for the print image data to the higher-level device 10 via the control line 12. At Step S125, the printer controller 14 waits for a response to the request to be sent from the higher-level device 10. When receiving the response from the higher-level device 10, the printer controller 14 requests, via the engine I/F control line 40a, the data-transfer control unit 30a to start transferring the data at Step S126.

At Step S127, the printer controller 14 waits for a data-transfer end notice from the higher-level device 10 and a data-transfer end notice from the data-transfer control unit 30a. When receiving the data-transfer end notices from the higher-level device 10 and the data-transfer control unit 30a via the control line 12 and the engine I/F control line 40a, respectively, the printer controller 14 proceeds the process to Step S128, at which the printer controller 14 sends a data-reception end notice for the Y color to the higher-level device 10 via the control line 12.

At Step S129, the printer controller 14 determines whether the data transfer for all of the Y, C, M, and K colors has ended. When the data transfer has not ended, the process returns to Step S124 and the processes for a next color are performed.

When determining, at Step S129, that the data transfer for all of the Y, C, M, and K colors has ended, the printer controller 14 increments the page number such that n=n+1 and returns the process to Step S123.

In FIG. 9B, it is explained that the processes from Step S124 to Step S128 are sequentially performed for the Y, C, M, and K colors; however, the present invention is not limited to this example. For example, it is possible to concurrently perform the processes from Step S124 to Step S128 for all of the colors Y, C, M, and K. In this case, at Step S129, the printer controller 14 waits for the data-reception end notices received at Step S128 in the respective processes for the Y, C, M, and K colors.

The printer controller 14 sends a print instruction to the data-transfer control units 30a, 30b, 30c, and 30d via the respective engine I/F control lines 40a, 40b, 40c, and 40d. With the print instruction, the data-transfer control units 30a to 30d read the print image data from the memories 31a to 31d, respectively, and printing of the print image data is performed on the printing sheet.

The print instruction sent from the printer controller 14 to each of the data-transfer control units 30a, 30b, 30c, and 30d may be generated as a table containing information that is needed to perform printing, such as information on setting of print conditions among the control information explained above with reference to FIG. 7. The printer controller 14 sends the table generated as above to each of the data-transfer control units 30a, 30b, 30c, and 30d.

FIG. 9C is a flowchart of an exemplary print instruction process performed by the printer controller 14 for instructing printing. It is assumed that the printer controller 14 has sent a print preparation instruction to the conveyance control unit 51 in advance of execution of the process of this flowchart.

At Step S140, the printer controller 14 determines whether the higher-level device 10 has sent a job end notice or not. When it is determined that the notice has been sent, the series of processes is terminated. When it is determined that the job end notice has not been sent from the higher-level device 10, the process proceeds to Step S141.

At Step S141, the printer controller 14 waits for an end of transfer of the print image data of at least one page for each of the Y, C, M, and K colors. When determining that the transfer of the print image data of one page is completed, the printer controller 14 proceeds the process to Step S142 and waits for a response indicating an end of print preparation to be sent from the conveyance control unit 51. When receiving the response indicating the end of the print preparation from the conveyance control unit 51 via the conveyance control line 41, at Step S143, the printer controller 14 sends a print instruction for instructing the data-transfer control units 30a to 30d to print the n-th page, via the respective engine I/F control lines 40a to 40d.

Figure 9D:
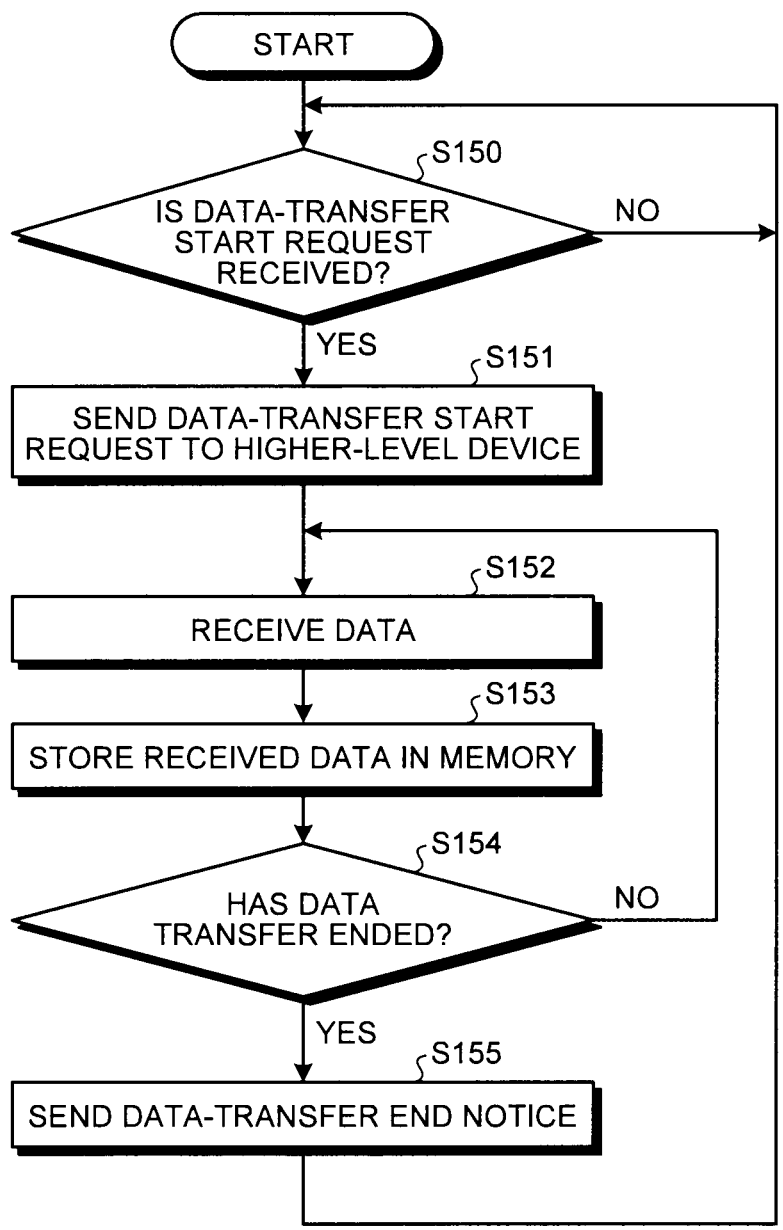
FIG. 9D is a flowchart of an exemplary process performed by each data-transfer control unit according to the embodiment of the present invention.

FIG. 9D is a flowchart of an exemplary process performed by each of the data-transfer control units 30a to 30d in relation to the data transfer. For simplicity of explanation, only the process performed by the data-transfer control unit 30a for the Y color will be explained below. At Step S150, the data-transfer control unit 30a waits for a data-transfer start request to be sent from the printer controller 14 via the engine I/F control line 40a.

When receiving the data-transfer start request, the data-transfer control unit 30a sends, to the higher-level device 10 via the data line 11a, a data transfer request for requesting transfer of print image data for the Y color at Step S151. The data-transfer control unit 30a receives the print image data for the Y color transferred from the higher-level device 10 via the data line 11a in response to the data transfer request (Step S152). The data-transfer control unit 30a controls the data transfer DMA 133a to store the received print image data for the Y color in a predetermined area in the memory 31a (Step S153).

At Step S154, the data-transfer control unit 30a determines whether or not the higher-level device 10 has ended the transfer of the print image data for the Y color. For example, the data-transfer control unit 30a determines whether or not the transfer of the print image data has ended on the basis of size information added to the transferred print image data. When it is determined that the transfer of the print image data has not ended, the process returns to Step S152, and data reception and data storage in the memory 31a are continued. On the other hand, when it is determined that the transfer of the print image data has ended, the process proceeds to Step S155 and a data-transfer end notice is sent to the printer controller 14 via the engine I/F control line 40a. Then, the process returns to Step S150.

FIGS. 10A to 10E are sequence diagrams illustrating a concrete example of the printing process according to the embodiment, which is performed in accordance with the flowcharts of FIGS. 9A to 9D. In FIGS. 10A to 10E, reference codes A to F indicate that processes continue to the same codes between the figures. In the following, it is assumed that a print job indicates printing of a total of two pages.

Figure 10A:
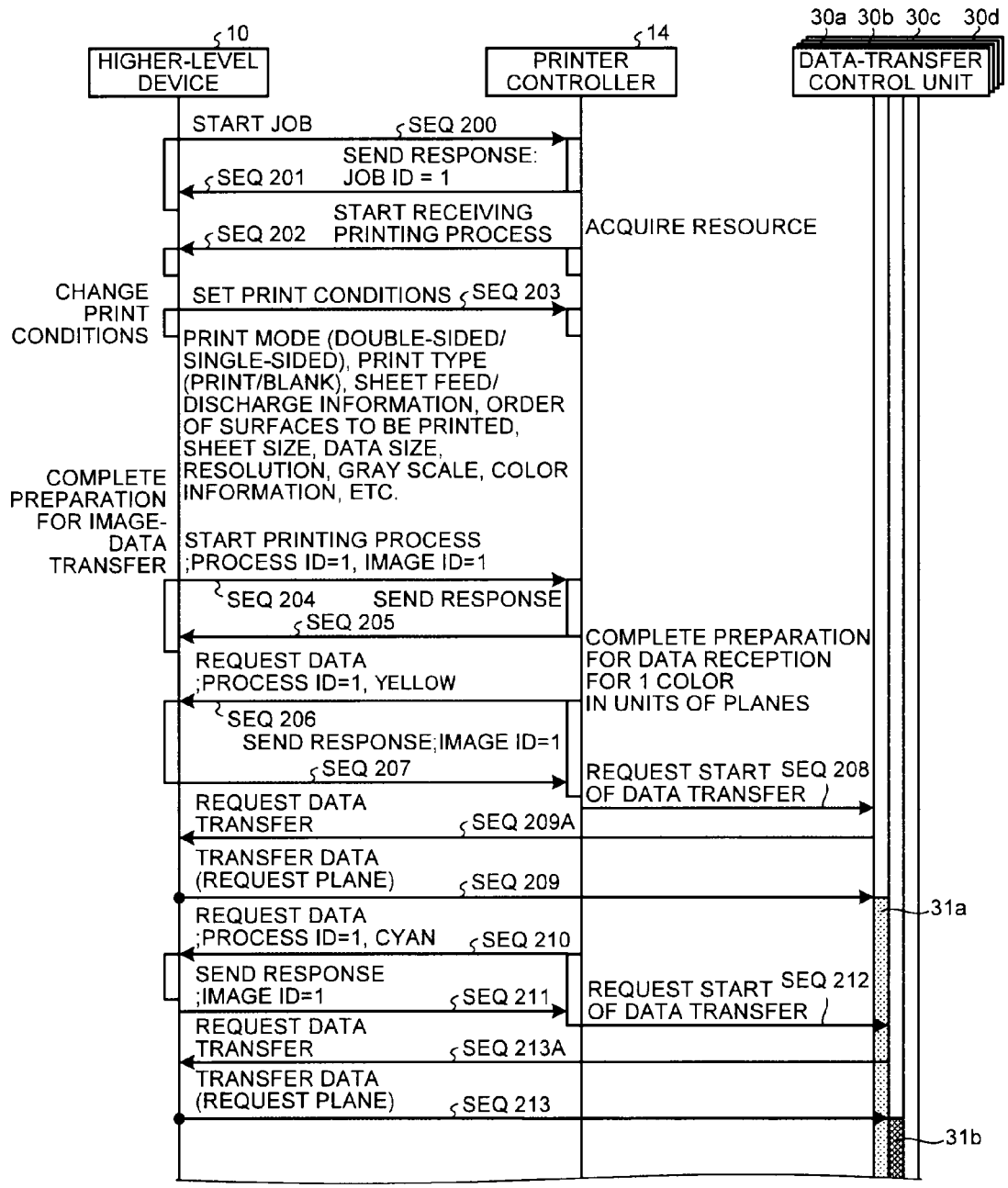
FIGS. 10A to 10E are sequence diagrams illustrating a concrete example of the printing process according to the embodiment of the present invention.
Figure 10B:
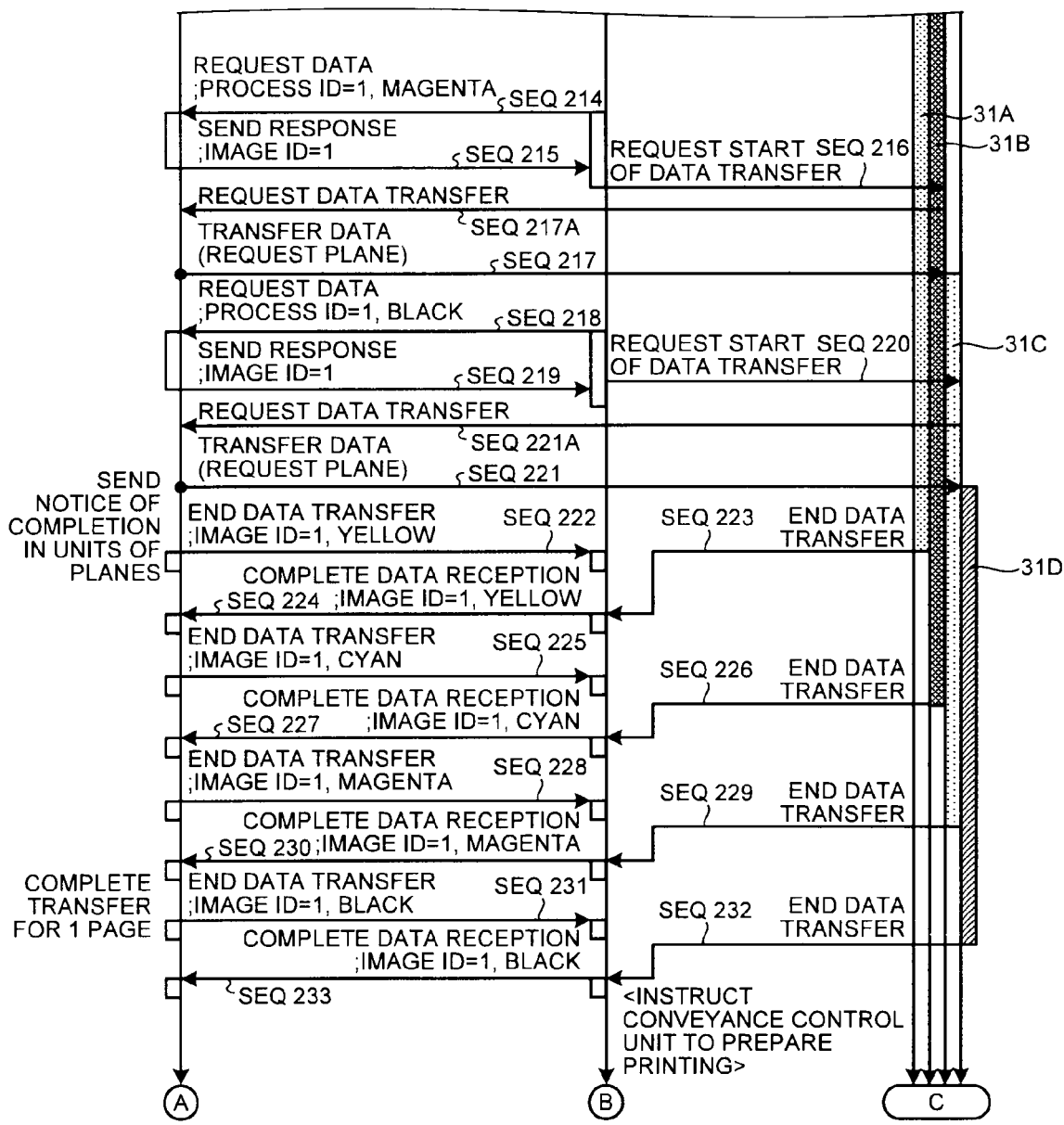

Referring to FIGS. 10A and 10B, the higher-level device 10 sends control information on a start of a job to the printer controller 14 via the control line 12 (SEQ 200). The printer controller 14 sends control information for replying a job identifier, which is set such that job ID=1, to the higher-level device 10 via the control line 12 in response to the control information on the start of the job (SEQ 201). At the same time, the printer controller 14 acquires a resource for executing the job in accordance with the start of the job. The printer controller 14 sends control information indicating a start of reception of a printing process to the higher-level device 10 via the control line 12 (SEQ 202).

The higher-level device 10 sends control information for setting print conditions to the printer controller 14 via the control line 12 (SEQ 203). The print conditions set to the printer controller 14 include, as explained with reference to FIG. 7, a print mode, a print type, information on sheet feed and sheet discharge, an order of surfaces to be printed, a size of a printing sheet, a size of print image data, resolution and grayscale, and color information. The print conditions may include information on the number of pages to be printed. When the printer controller 14 receives the control information, the various print conditions contained in the received information are written in, for example, a register of the printer controller 14, so that the print conditions are set.

The higher-level device 10 sends control information for starting a print process for a first page to the printer controller 14 via the control line 12 (SEQ 204). The control information contains a process identification number, which is set such that process ID=1 for identifying the process, and an image identification number, which is set such that image ID=1 for indicating an image that forms the first page. The printer controller 14 returns control information on a start of the printing process to the higher-level device 10 as a response to the start of the process (SEQ 205).

The printer controller 14 sends control information on a request for a printing process to the higher-level device 10 in order to request the print image data. The printing process is requested in sequence for the Y, C, M, and K colors in order of arrangement of the colors in the printer engine 15. In this example, it is assumed that the heads 56a, 56b, 56c, and 56d for the Y, C, M, and K colors are aligned in this order along the conveying direction of the printing sheet 201.

The printer controller 14 sends, to the higher-level device 10 via the control line 12, control information on the request for the printing process in order to request the print image data for the Y color (SEQ 206). The control information contains a process identification number, which is set such that process ID=1 for specifying a process, and color information Yellow for specifying the Y color. The higher-level device 10 returns control information containing an image identification number, which is set such that image ID=1, to the printer controller 14 as a response to the control information on the request (SEQ 207). When receiving the control information, the printer controller 14 requests the data-transfer control unit 30a corresponding to the Y color to start transferring the print image data (SEQ 208). At this time, the printer controller 14 sends, to the data-transfer control unit 30a, a data size of the print image data for which the transfer is requested, in addition to the request.

When receiving the request, the data-transfer control unit 30a requests the higher-level device 10 to transfer the print image data of a plane for the Y color via the data line 11a (SEQ 209A). The higher-level device 10 transfers the print image data for the Y color to the data-transfer control unit 30a in response to the request (SEQ 209). The transferred print image data is stored in an area that is allocated for the print image data of the first image in the memory 31a of the data-transfer control unit 30a.

For the other colors of C, M, and K, the same processes as those at SEQ 206, SEQ 207, SEQ 208, SEQ 209A, and SEQ 209 described above are repeated, so that pieces of print image data for these colors are transferred from the higher-level device 10 to the data-transfer control units 30b, 30c, and 30d via the data lines 11b, 11c, and 11d, and stored in areas that are allocated for the pieces of the print image data of the first page in the memories 31b, 31c, and 31d, respectively (SEQ 210 to SEQ 221).

When the transfer of the print image data for one plane is completed, the higher-level device 10 sends control information on completion of the data transfer to the printer controller 14. The printer controller 14 sends control information on completion of reception of the print image data to the higher-level device 10 in response to the control information on the completion of the data transfer.

For example, when the transfer of the print image data of the plane for the Y color is completed, the higher-level device 10 sends, to the printer controller 14, control information on the completion of the data transfer, which contains the image identification number set such that image=1 and contains the color information Yellow (SEQ 222). When the transfer of the print image data from the higher-level device 10 via the data line 11a is completed, the data-transfer control unit 30a sends a notice of the completion of the transfer to the printer controller 14 (SEQ 223). The printer controller 14 sends control information on completion of data reception, which contains the image identification number set such that image=1 and the color information Yellow, to the higher-level device 10 in response to the notice (SEQ 224).

For the other colors of C, M, and K, the same processes as those at SEQ 222 to SEQ 224 described above are repeated in accordance with the completion of the transfer of each print image data, and control information on the completion of the data reception is sent to the higher-level device 10 (SEQ 225 to SEQ 233).

After sending, to the higher-level device 10, the control information on the completion of reception of the last piece of print image data of the first page (i.e., the print image data for the K color) at SEQ 233, the printer controller 14 instructs the conveyance control unit 51 to prepare printing. The conveyance control unit 51 starts conveying the printing sheet 201 to a print position in accordance with the instruction.

Figure 10C:
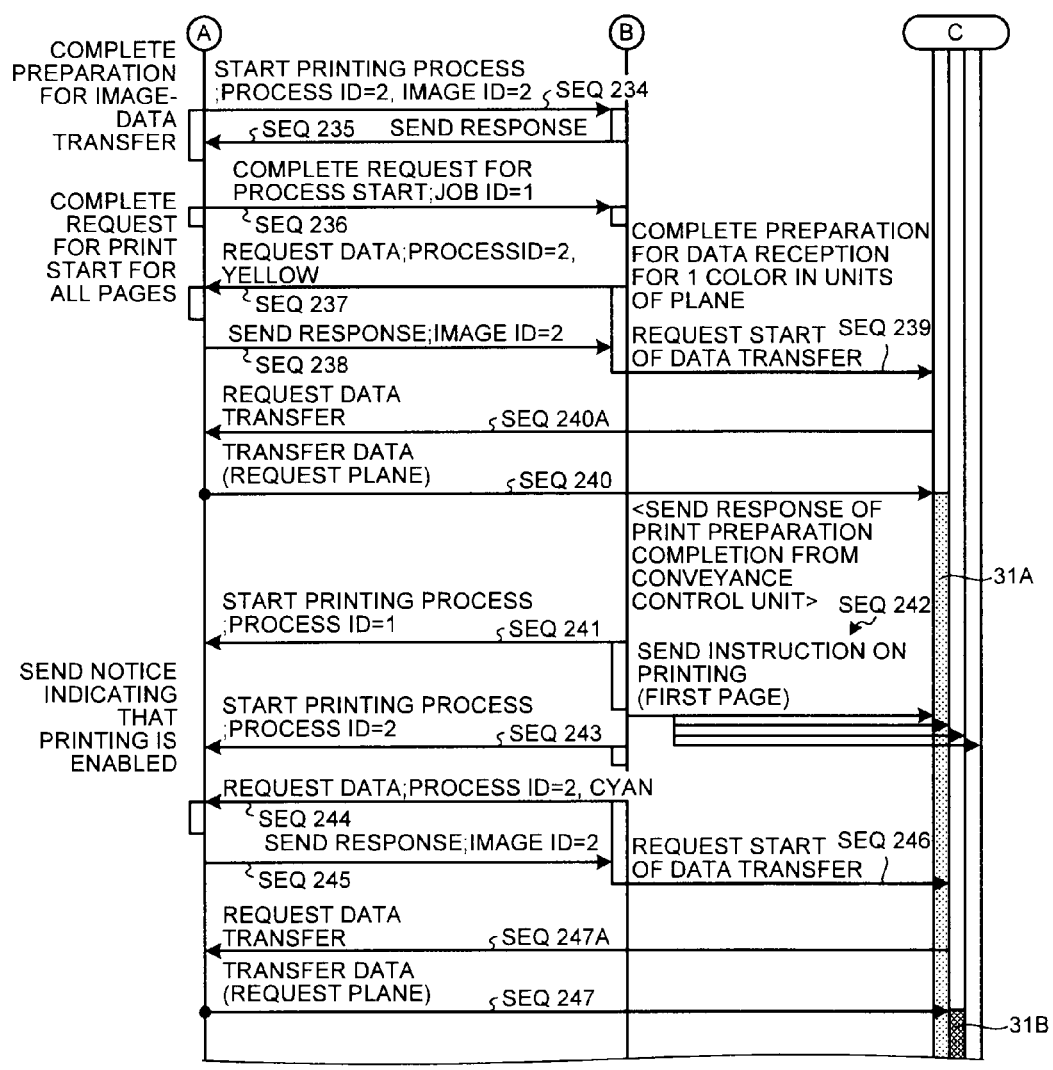
Figure 10D:
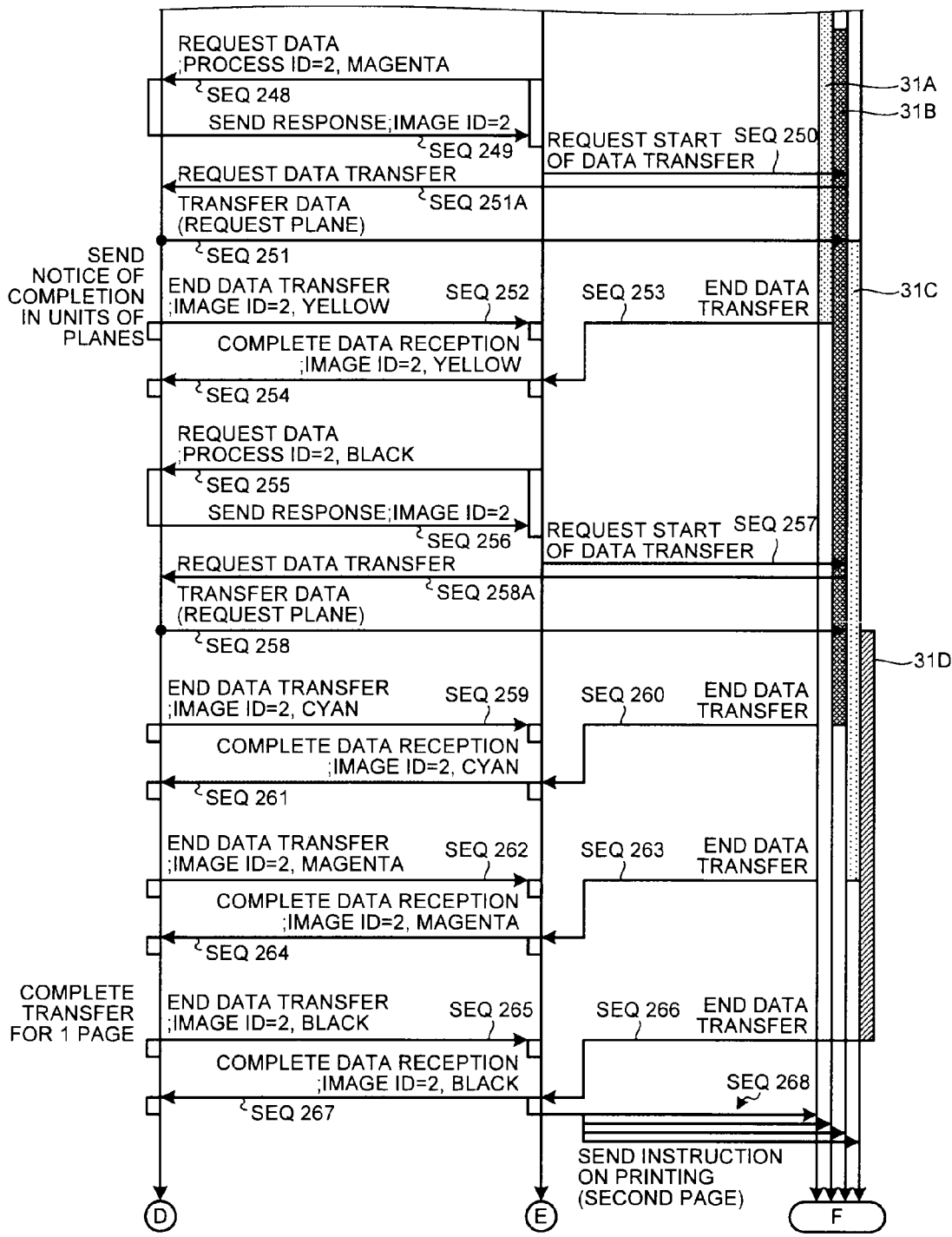

The explanation continues with reference to FIGS. 10C and 10D. When the transfer of the print image data of the first page for each color is completed, the higher-level device 10 sends control information on a start of a printing process for the second page to the printer controller 14 via the control line 12 (SEQ 234). The control information contains a process identification number, which is set such that process ID=2 for identifying a process for the second page, and an image identification number, which is set such that image=2 for identifying an image that forms the second page. The printer controller 14 returns control information on a start of the printing process to the higher-level device 10 as a response to the start of the printing process (SEQ 235).

For example, when a total of two pages is to be printed, a request for a start of the printing process is completed by the processes at SEQ 234 and SEQ 235. Therefore, when receiving a response to the request for the start of the printing process for the second page at SEQ 235, the higher-level device 10 sends control information on completion of the request for the start of the printing process, for which the job identifier is specified such that job ID=1, to the printer controller 14 at SEQ 236.

Similarly to the processes at SEQ 206 to SEQ 221 described above, the printer controller 14 sends control information on a request for a printing process to the higher-level device 10 in order to request the print image data. The printing process is requested in sequence for the Y, C, M, and K colors in order of arrangement of the colors in the printer engine 15.

The printer controller 14 sends, to the higher-level device 10 via the control line 12, control information on the request for the printing process in order to request the print image data for the Y color (SEQ 237). The control information contains a process identification number, which is set such that process ID=2 for specifying a process, and color information Yellow for specifying the Y color. The higher-level device 10 returns control information containing an image identification number, which is set such that image ID=2, to the printer controller 14 as a response to the control information on the request (SEQ 238). When receiving the control information, the printer controller 14 requests the data-transfer control unit 30a corresponding to the Y color to start transferring the print image data (SEQ 239).

When receiving the request, the data-transfer control unit 30a requests the higher-level device 10 to transfer the print image data of a plane for the Y color via the data line 11a (SEQ 240A). The higher-level device 10 transfers the print image data for the Y color to the data-transfer control unit 30a in response to the request (SEQ 240). The transferred print image data is stored in an area that is allocated for the print image data of the second page in the memory 31a of the data-transfer control unit 30a.

For the other colors of C, M, and K, the same processes as those at SEQ 237, SEQ 238, SEQ 239, SEQ 240A and SEQ 240 described above are repeated, so that pieces of print image data for these colors are transferred from the higher-level device 10 to the data-transfer control units 30b, 30c, and 30d via the data lines 11b, 11c, and 11d, and stored in areas that are allocated for the pieces of the print image data of the second page in the memories 31b, 31c, and 31d, respectively (SEQ 244 to SEQ 251 and SEQ 255 to SEQ 258).

Similarly to the above, the higher-level device 10 sends control information on completion of the data transfer to the printer controller 14 every time the transfer of the print image data of one plane is completed. The printer controller 14 sends control information on completion of reception of the print image data to the higher-level device 10 in response to the control information on the completion of the data transfer.

In the example of FIGS. 10C and 10D, when the transfer of the print image data for the Y color is completed at SEQ 240, the higher-level device 10 sends control information on completion of the data transfer to the printer controller 14 (SEQ 252). When the transfer of the print image data from the higher-level device 10 via the data line 11a is completed, the data-transfer control unit 30a sends a notice of the completion of the transfer to the printer controller 14 (SEQ 253). The printer controller 14 sends control information on completion of data reception, which contains the image identification number set such that image=2 and the color information Yellow, to the higher-level device 10 in response to the notice (SEQ 254).

For the other colors of C, M, and K, the same processes as those at SEQ 252 to SEQ 254 described above are performed in accordance with the completion of the transfer of each print image data, and control information on the completion of the data reception is sent to the higher-level device 10 (SEQ 259 to SEQ 267).

In the example of FIGS. 10C and 10D, a response, which indicates that preparation for the printing is completed and which is sent from the conveyance control unit 51 in response to the instruction that has been sent just before SEQ 234 to the conveyance control unit 51 for preparing the printing, is sent from the conveyance control unit 51 to the printer controller 14 just after SEQ 240. When receiving the response, the printer controller 14 sends two pieces of control information on a start of the printing process, one of which contains a process identification number set such that process ID=1 and the other of which contains a process identification number set such that process ID=2, to the higher-level device 10 (SEQ 241 and SEQ 243). Accordingly, notices indicating that printing on the first page and the second page is enabled are sent to the higher-level device 10.

At SEQ 241, the print image data of the first page for each color has already been transferred to each of the data-transfer control units 30a, 30b, 30c, and 30d. Therefore, the printer controller 14 sends a print instruction to each of the data-transfer control units 30a, 30b, 30c, and 30d to perform printing for the first page (SEQ 242). The print instruction is stored in, for example, each of the memories 31a, 31b, 31c, and 31d of the data-transfer control units 30a, 30b, 30c, and 30d. Actual printing operation according to the print instruction is performed by adjusting timing with, for example, printing operations for a successive page.

In the example of FIGS. 10C and 10D, in the printer controller 14, a request to the higher-level device 10 for requesting transfer of print image data of a plane for the C color, which is secondarily transferred, is delayed because the control information on the start of the printing process has been sent at SEQ 241 and SEQ 243 (see SEQ 244). Because of the delay, the transfer of the print image data of the plane for the Y color, which is firstly started, ends before transfer of the print image data of a plane for the K color is started (see SEQ 253). Furthermore, after a transfer completion notice for the print image data of the plane for the Y color has been sent (SEQ 253), the transfer of the print image data of the plane for the K color is started (SEQ 257 and SEQ 258).

In the data transfer process for the first page as illustrated in FIGS. 10A and 10B, the pieces of the print image data for the respective colors are transferred in order of the colors, and after the transfer of the print image data ends, data-transfer end processes are performed in order of the colors. On the other hand, in the data transfer process for the second page illustrated in FIGS. 10C and 10D, the data-transfer end processes are started before the transfer of the pieces of the image data for the respective color ends.

According to the embodiment, the data-transfer control units 30a, 30b, 30c, and 30d that control data transfer for the colors of Y, C, M, and K are structured independently of each other; the printer controller 14 can perform communication with the data-transfer control units 30a, 30b, 30c, and 30d independently; and the data-transfer control units 30a, 30b, 30c, and 30d can independently execute processes. Therefore, even when other processes are interposed into a series of processes performed by each of the data-transfer control units 30a, 30b, 30c, and 30d, it is not necessary to change any of the processes.

At SEQ 267, the printer controller 14 sends a notice indicating that the print image data of the plane for the K color has been transferred to the higher-level device. Thereafter, the printer controller 14 sends a print instruction to each of the data-transfer control units 30a, 30b, 30c, and 30d to perform printing of the second page (SEQ 268).

Figure 10E:
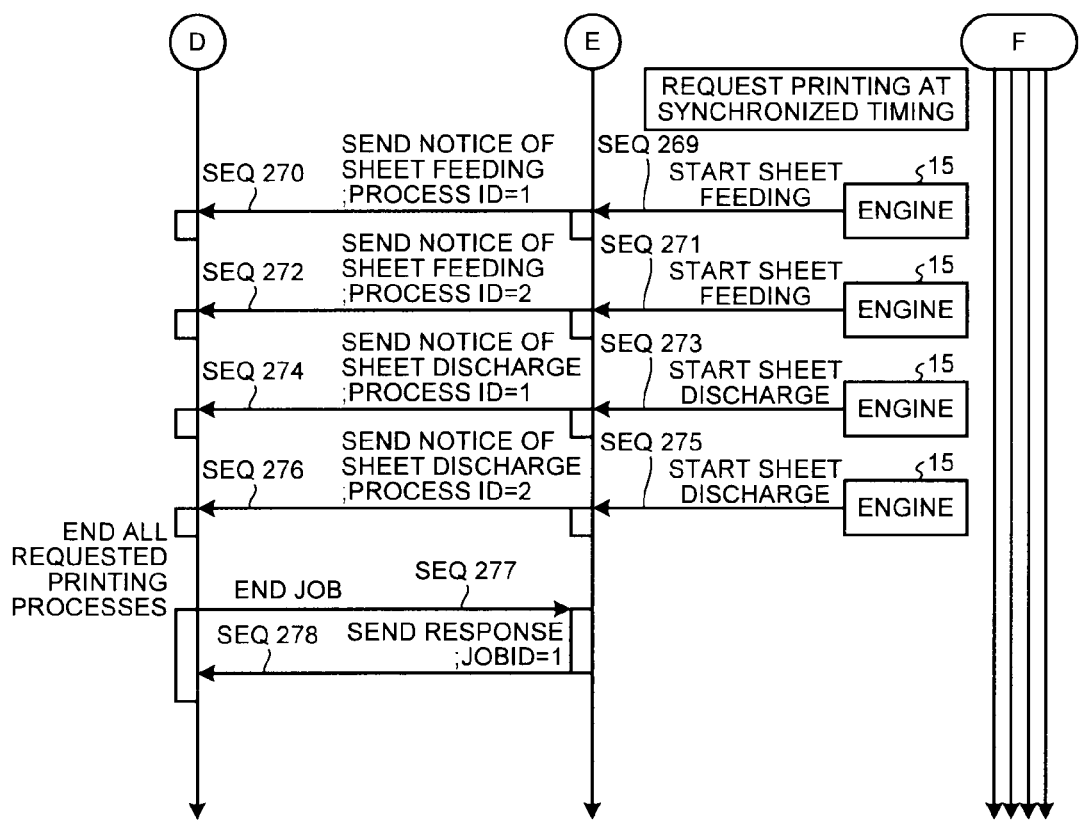

The explanation continues with reference to FIG. 10E. The printer engine 15 performs printing of the first page in accordance with the print instruction sent at SEQ 242 and starts feeding the printing sheet 201. The printer engine 15 sends a notice to the printer controller 14 that the feeding of the first page is started (SEQ 269). When receiving the notice, the printer controller 14 sends control information indicating that the feeding of the first page is started to the higher-level device 10 by setting the process identification number such that process ID=1 (SEQ 270). At the same time, the printer controller 14 sends a print instruction to the data-transfer control units 30a, 30b, 30c, and 30d to perform printing in synchronization with each other. The data-transfer control units 30a, 30b, 30c, and 30d read print image data for the respective Y, C, M, and K colors from the memories 31a, 31b, 31c, and 31d, and sequentially perform printing of respective planes of the first page on the printing sheet 201, in accordance with the print instruction.

Similarly, when the printing of the first page is completed and a process proceeds to printing of the second page, the printer engine 15 sends a notice to the printer controller 14 that feeding of the second page is started (SEQ 271). When receiving the notice, the printer controller 14 sends control information indicating that the feeding of the second page is stated to the higher-level device 10 by setting the process identification number such that process ID=2 (SEQ 272). At the same time, the printer controller 14 sends a print instruction to the data-transfer control units 30a, 30b, 30c, and 30d to perform printing in synchronization with each other. The data-transfer control units 30a, 30b, 30c, and 30d read print image data for the respective Y, C, M, and K colors from the memories 31a, 31b, 31c, and 31d, and sequentially perform printing of respective planes of the second page on the printing sheet 201, in accordance with the print instruction.

When the printing of the first page for each color is completed and the first page of the printing sheet 201 is discharged, the printer engine 15 sends a notice of the completion and the discharge to the printer controller 14 (SEQ 273). When receiving the notice, the printer controller 14 sends control information indicating that the first page of the printing sheet 201 is discharged by setting the process identification number such that process ID=1 (SEQ 274). Similarly, when printing of the second page for each color is completed and the second page of the printing sheet 201 is discharged, the printer engine 15 sends a notice of the completion and the discharge to the printer controller 14 (SEQ 275), and the printer controller 14 sends control information indicating that the second page of the printing sheet is discharged by setting the process identification number such that process ID=2 in response to the notice (SEQ 276).

When receiving, from the printer controller 14, a discharge notice corresponding to information on the number of pages to be printed as contained in, for example, the control information on the print conditions set at SEQ 203, the higher-level device 10 determines that the printing for the job, the start of which has been notified at SEQ 200, is completed, and thereafter sends, to the printer controller 14, control information on completion of the job by setting a job identification number such that job ID=1 (SEQ 277). When receiving the control information, the printer controller 14 sends, to the higher-level device 10, control information on a response by setting the job identification number such that job ID=1 (SEQ 278). Accordingly, the series of processes ends.

As described above, according to the embodiment, the printer controller 14 integrally implements various functions that have been performed by each data managing unit for each color, such as control on timing of transferring print image data from the higher-level device 10 or exchange of control information with the higher-level device 10. Besides, the data managing units corresponding to respective colors (i.e., the data-transfer control units 30a to 30d) perform only reception and read of print image data. Therefore, it is possible to speed up a process of transferring the print image data.

Furthermore, according to the embodiment, the data-transfer control units 30a, 30b, 30c, and 30d that control data transfer for the respective colors of Y, C, M, and K are structured independently of each other. In addition, the printer controller 14 is connected to the data-transfer control units 30a, 30b, 30c, and 30d via the engine I/F control lines 40a, 40b, 40c, and 40d, respectively so that communication between the printer controller 14 and each of the data-transfer control units 30a, 30b, 30c, and 30d can be separately performed. Moreover, the data-transfer control units 30a, 30b, 30c, and 30d can independently perform processes.

Therefore, as in the processes at SEQ 237 to SEQ 266 described above, even when other processes are interposed into the series of processes performed by each of the data-transfer control units 30a, 30b, 30c, and 30d, it is not necessary to change any of the processes. Furthermore, because the data-transfer control units 30a, 30b, 30c, and 30d perform processes independently of each other, it is possible to easily add or delete the data-transfer control units 30a, 30b, 30c, and 30d. Therefore, it is possible to provide various variations in system configurations by using a common structure.

Modification of the Embodiment

A modification of the embodiment will be explained below. In the above embodiment, in the process of transferring print image data for each color, the higher-level device 10 transfers the print image data for each color in response to a data transfer request that is sent form the data-transfer control unit 30a, 30b, 30c, or 30d via the data lines 11a, 11b, 11c, or 11d. According to the modification, the data-transfer control units 30a, 30b, 30c, and 30d do not send the data transfer request to the higher-level device 10. After replying to a data request from the printer controller 14, the higher-level device 10 directly transfers print image data for each color to the data-transfer control units 30a to 30d via the data lines 11a to 11d.

Figure 11A:
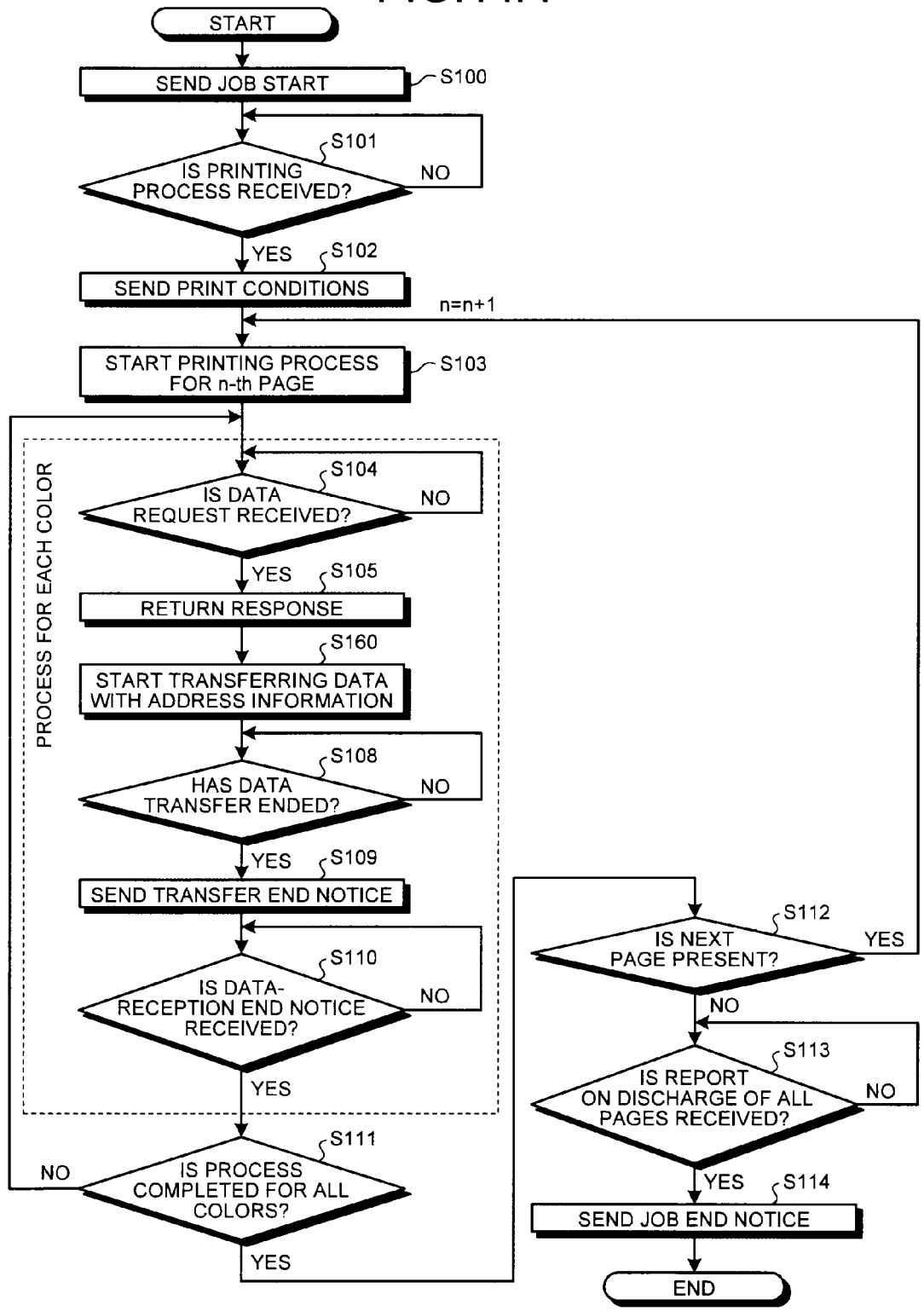
FIG. 11A is a flowchart of an exemplary process performed by a higher-level device according to a modification of the embodiment of the present invention.

A data transfer process for transferring print image data according to the modification will be explained below with reference to flowcharts of FIGS. 11A and 11B. FIG. 11A is a flowchart of an exemplary process performed by the higher-level device 10 in relation to data transfer according to the modification. In FIG. 11A, the same processes as those of FIG. 9A described above are denoted by the same reference numerals and the detailed explanation will not be repeated.

As illustrated in the flowchart of FIG. 11A, among the processes performed by the higher-level device 10, the processes from Step S100, at which control information indicating a start of a job is sent, to Step S105, at which a response to the data request, which has been sent from the printer controller 14, is returned to the printer controller 14, are the same as those explained with reference to FIG. 9B; therefore, the same explanation will not be repeated.

According to the modification, after sending a response to the data request, which has been sent form the printer controller 14, to the printer controller 14 via the control line 12 at Step S105, the higher-level device 10 proceeds the process to Step S160. At Step S160, the higher-level device 10 sends print image data for the Y color to the data-transfer control unit 30a via the data line 11a and the print image data is stored in the memory 31a of the data-transfer control unit 30a. At this time, for example, the higher-level device 10 adds address information on the memory 31a to the print image data to be sent and send the information with the address to the higher-level device 10. The data-transfer control unit 30a stores the print image data in the memory 31a in accordance with the address information added to the print image data.

The higher-level device 10 performs the process of transferring the print image data at Step S160 for a predetermined volume of data, that is, until the transfer of the print image data for one page ends. When determining that the transfer of the print image data has ended at Step S108, the higher-level device 10 sends a notice of the end of the data transfer to the printer controller 14 via the control line 12 at Step S109 and waits for a response to the notice to be sent from the printer controller 14 at Step S110. The subsequent processes are the same as the processes explained with reference to FIG. 9A; therefore, the same explanation will not be repeated.

According to the modification, a data transfer process and a print instruction process performed by the printer controller 14 are the same as the processes explained with reference to FIGS. 9B and 9C in the above embodiment; therefore, the same explanation will not be repeated.

FIG. 11B is a flowchart of an exemplary process performed by the data-transfer control unit 30a in relation to the data transfer according to the modification. In FIG. 11B, the same processes as those of FIG. 9D are denoted by the same reference numerals and the detailed explanation will not be repeated.

At Step S150, the data-transfer control unit 30a waits for a data-transfer start request to be sent from the printer controller 14 via the engine I/F control line 40a. When receiving the data-transfer start request from the printer controller 14, the data-transfer control unit 30a proceeds the process to Step S161 and receives print image data for the Y color transferred from the higher-level device 10 via the data line 11a. The data-transfer control unit 30a stores the print image data in the memory 31a in accordance with address information added to the print image data.

At Step S154, the data-transfer control unit 30a determines whether the higher-level device 10 has ended the transfer of the print image data for the Y color. For example, the data-transfer control unit 30a determines whether the transfer of the print image data has ended on the basis of size information that the higher-level device 10 has added to the print image data to be transferred. The higher-level device 10 may send information indicating the end to the data-transfer control unit 30a at the end of the transfer of the print image data. When it is determines that the transfer of the print image data has not ended, the process returns to Step S161 and data reception and data storage in the memory 31a are continued.

On the other hand, when it is determined that the transfer of the print image data has ended, the process proceeds to Step S155 and a data-transfer end notice is sent to the printer controller 14 via the engine I/F control line 40a. Then, the process is returned to Step S150.

As described above, the present invention may be applied to a system in which the data-transfer control units 30a, 30b, 30c, and 30d do not send data transfer requests to the higher-level device 10 but the higher-level device 10 directly transfers print image data for each color to the data-transfer control units 30a to 30d via the data lines 11a to 11d after the higher-level device 10 has returned a response to the data request sent from the printer controller 14.

Other Embodiments

As another embodiment of the present invention, a printing device includes one or more data managing means for controlling storage of image data, which is transferred from a higher-level device via a first transfer path, in a storage means and controlling read of the image data from the storage means; one or more printing means for printing the image data, which has been read from the storage means, on a sheet; an output control means for outputting the image data, which has been read from the storage means of the one or more data managing means, to a printing means that is specified in advance from among the one or more printing means; and a print control means for requesting, via a second transfer path, the higher-level device to transfer image data for each of the data managing means.

In the printing device, each of the data managing means includes a storage means.

In the printing device, each of the data transfer means is connected to the higher-level device via one or more first transfer paths that are different from each other.

The printing device further includes a conveying means for conveying the sheet. In the printing device, the print control means instructs the data managing means to start read of image data from the storage means when the sheet is conveyed to a print position by the conveying means.

In the printing device, the print control means instructs the conveying means to start conveying the sheet to the print position when transfer of the image data to the storage means by one or more data transferring means ends.

In the printing device, the first transfer paths, the data managing means, and the printing means are provided for each of colors, and the print control means controls transfer of image data via the first transfer paths and read out of the image data from the storage means for each of the colors.

In the printing device, the data managing means are formed of a logic circuit.

A method of controlling the printing device includes a data managing step performed by one or more data managing means for controlling storage of image data, which is transferred from a higher-level device via a first transfer path, in a storage means and controlling read of the image data from the storage means; a printing step performed by one or more printing means for printing the image data, which has been read from the storage means, on a sheet; an output control step performed by an output control means for outputting image data, which has been read from the storage means of the one or more data managing means, to a printing means that is specified in advance from among the printing means; and a print control step for requesting, via a second transfer path, the higher-level device to transfer image data for each of the data managing means.

According to an aspect of the present invention, it is possible to transfer image data at higher speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a higher-level device that generates a plurality of pieces of raster image data for different colors by performing a raster image processing on print job data supplied from a host device, and generates control information, which is used for controlling printing operations; and
an image forming unit that includes a print controller and a printer engine including a plurality of data storage units,
wherein the print controller issues, to the higher-level device, a request to transfer pieces of the image data for different colors of a page,
wherein the plurality of data storage units receive respective pieces of the image data transferred from the higher-level device in response to the request via a plurality of first transfer paths corresponding to the respective pieces of the image data, and store therein the respective pieces of the image data, and
the print controller receives control information from the higher-level device via a second transfer path, controls the data storage units on the basis of the control information so that the data storage units receive and store therein the respective pieces of the image data transferred from the higher-level device, controls the printer engine on the basis of the received control information so as to form an image based on the pieces of image data onto a recording medium, and issues, to the higher-level device, a next request to transfer pieces of the image data for different colors of a next page.

2. The image forming apparatus according to claim 1, wherein
each of the data storage units transfers the stored image data to the image forming unit under control by the print controller.

3. The image forming apparatus according to claim 1, wherein
each of the data storage units includes
a memory unit that stores therein corresponding one of the pieces of the image data; and
a logic circuit that causes the memory unit to store the corresponding one of the pieces of the image data.

4. The image forming apparatus according to claim 1, wherein
the data storage units
request the higher-level device to transfer the pieces of the image data via the respective first transfer paths under control by the print controller, and
receive and store therein the respective pieces of the image data transferred from the higher-level device via the respective first transfer paths under control by the print controller.

5. The image forming apparatus according to claim 1, wherein
when receiving, from the print controller, information on a start of data transfer, the data storage units receive the respective pieces of the image data transferred from the higher-level device via the respective first transfer paths.

6. A method of controlling an image forming apparatus that includes a higher-level device, and an image forming unit having a print controller and a printer engine that includes a plurality of data storage units, the method comprising:
- generating, with the higher-level device, a plurality of pieces of raster image data for different colors by performing a raster image processing on print job data supplied from a host device, and generating control information, which is used for controlling printing operations; and
- issuing, with the print controller, to the higher-level device, a request to transfer pieces of the image data for different colors of a page;
- receiving, by the plurality of data storage units, the respective pieces of the image data transferred from the higher-level device in response to the request via a plurality of first transfer paths corresponding to the respective pieces of the image data;
- storing, in the data storage units, the respective pieces of the image data;
- receiving, by the print controller, control information from the higher-level device via a second transfer path;
- controlling the data storage units by the print controller, on the basis of the control information, so that the data storage units receive and store therein, reception of the respective pieces of the image data transferred from the higher-level device
- controlling, with the print controller, the printer engine on the basis of the received control information so as to form an image based on the pieces of image data onto a recording medium, and
- issuing with the print controller, to the higher-level device, a next request to transfer pieces of the image data for different colors of a next page.

7. An image processing apparatus comprising:
- a higher level device that generates a plurality of pieces of raster image data for different colors by performing a raster image processing on the basis of print job data supplied from a host device, and generates control information, which is used for controlling printing operations;
- an image generating unit that includes a print controller and a printer engine including a plurality of data storage units, wherein the print controller issues, to the higher-level device, a request to transfer pieces of the image data for different colors of a page,
- wherein the plurality of data storage units receive respective pieces of the image data transferred from the higher-level device in response to the request via a plurality of first transfer paths corresponding to the respective pieces of the image data, and store therein the respective pieces of the image data,
- wherein the print controller is configured to receive the control information from the higher-level device via a second transfer path, control the data storage units on the basis of the control information so that the data storage units receive and store therein the respective pieces of the image data transferred from the higher-level device, control the printer engine on the basis of the received control information so as to form an image based on the pieces of image data onto a recording medium, and issue, to the higher-level device, a next request to transfer pieces of the image data for different colors of a next page.

* * * * *